US008027752B2

(12) United States Patent
Castaldo et al.

(10) Patent No.: US 8,027,752 B2
(45) Date of Patent: Sep. 27, 2011

(54) NETWORK FOR CHANGING RESOURCE CONSUMPTION IN AN APPLIANCE

(75) Inventors: Rodrigo C. Castaldo, Joinville (BR); Matthew P. Ebrom, Holland, MI (US); Wallace J. Elston, Paw Paw, MI (US); Gale R. Horst, Watervilet, MI (US); Randy L. Jeffery, Stevensville, MI (US); Anthony E. Jenkins, Stevensville, MI (US); Richard A. McCoy, Stevensville, MI (US); Christopher S. Moes, Sodus, MI (US); Matthew J. Nibbelink, St. Joseph, MI (US); Andre O. Pires, Joinville (BR); Randy A. Voss, St. Joseph, MI (US); Andrew D. Whipple, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 389 days.

(21) Appl. No.: 11/933,078

(22) Filed: Oct. 31, 2007

(65) Prior Publication Data
US 2008/0122585 A1 May 29, 2008

Related U.S. Application Data

(63) Continuation-in-part of application No. PCT/US2006/022503, filed on Jun. 9, 2006.

(60) Provisional application No. 60/595,148, filed on Jun. 9, 2005.

(51) Int. Cl.
G05B 11/01 (2006.01)

(52) U.S. Cl. .................................. 700/296; 700/295

(58) Field of Classification Search .................. 700/22, 700/275, 295, 286, 296, 297
See application file for complete search history.

(56) References Cited

U.S. PATENT DOCUMENTS

| 2,598,961 | A | 12/1945 | Andrus |
| 3,005,109 | A | 6/1960 | Funkhouser et al. |
| 3,925,680 | A | 12/1975 | Dixon |
| 4,090,088 | A | 5/1978 | McMahon et al. |
| 4,168,491 | A | 9/1979 | Phillips et al. |

(Continued)

FOREIGN PATENT DOCUMENTS

DE 4004057 A1 8/1991

(Continued)

OTHER PUBLICATIONS

"Household Response to Incentive Payment for Load Shifting: A Japanese Time-of-Day Electricity Pricing Experiment", Isamu et al., Energy Journal, 21, 1, 73, Jan. 2000.

(Continued)

Primary Examiner — Ryan Jarrett
(74) Attorney, Agent, or Firm — Robert A. Bacon; McGarry Bair PC

(57) ABSTRACT

A network includes a smart coupler having a processor, a memory with software, and a power source to energize the processor and the memory, and an appliance configured to perform an operation on a physical article. The appliance is one that consumes at least some of a resource in performing the operation. The network also includes a source of information about the resource. The smart coupler is in communication with the appliance and the source, and the processor and memory operate to request a change to the operation of the appliance in response to a resource parameter or a request communicated by the source.

18 Claims, 31 Drawing Sheets

U.S. PATENT DOCUMENTS

| | | |
|---|---|---|
| 4,247,786 A | 1/1981 | Hedges |
| 4,293,915 A | 10/1981 | Carpenter et al. |
| 4,303,990 A | 12/1981 | Seipp |
| 4,336,462 A | 6/1982 | Hedges et al. |
| 4,472,640 A | 9/1984 | Elmer |
| 4,476,398 A | 10/1984 | Hallam |
| 4,480,307 A | 10/1984 | Budde et al. |
| 4,503,535 A | 3/1985 | Budde et al. |
| 4,612,619 A | 9/1986 | Culp |
| 4,771,185 A | 9/1988 | Feron et al. |
| 4,819,180 A | 4/1989 | Hedman et al. |
| 4,829,159 A | 5/1989 | Braun et al. |
| 4,847,781 A | 7/1989 | Brown, III et al. |
| 4,847,782 A | 7/1989 | Brown, Jr. et al. |
| 4,977,515 A * | 12/1990 | Rudden et al. ............... 700/296 |
| 4,998,024 A | 3/1991 | Kirk et al. |
| 5,017,799 A | 5/1991 | Fishman |
| 5,113,398 A | 5/1992 | Howes |
| 5,168,170 A | 12/1992 | Hartig |
| 5,272,585 A | 12/1993 | Gibbs |
| 5,321,229 A | 6/1994 | Holling et al. |
| 5,359,540 A | 10/1994 | Ortiz |
| 5,424,903 A | 6/1995 | Schreiber |
| 5,436,510 A | 7/1995 | Gilbert |
| 5,481,140 A | 1/1996 | Maruyama et al. |
| 5,483,656 A | 1/1996 | Oprescu et al. |
| 5,502,339 A | 3/1996 | Hartig |
| 5,506,790 A | 4/1996 | Nguyen |
| 5,517,622 A | 5/1996 | Ivanoff et al. |
| 5,543,667 A | 8/1996 | Shavit et al. |
| 5,544,036 A | 8/1996 | Brown, Jr. et al. |
| 5,563,455 A | 10/1996 | Cheng |
| 5,572,438 A | 11/1996 | Ehlers et al. |
| 5,579,201 A | 11/1996 | Karageozian |
| 5,581,132 A | 12/1996 | Chadwick |
| 5,659,601 A | 8/1997 | Cheslog |
| 5,754,445 A | 5/1998 | Jouper et al. |
| 5,754,548 A | 5/1998 | Hoekstra et al. |
| 5,761,083 A | 6/1998 | Brown, Jr. et al. |
| 5,831,345 A | 11/1998 | Michaud |
| 5,844,326 A | 12/1998 | Proctor et al. |
| 5,880,677 A | 3/1999 | Lestician |
| 6,018,690 A | 1/2000 | Saito et al. |
| 6,018,726 A | 1/2000 | Tsumura |
| 6,028,977 A | 2/2000 | Newsome |
| D422,680 S | 4/2000 | Guo |
| 6,105,122 A | 8/2000 | Muller et al. |
| 6,111,762 A | 8/2000 | Igarashi et al. |
| 6,121,593 A | 9/2000 | Mansbery et al. |
| 6,148,349 A | 11/2000 | Chow et al. |
| 6,150,955 A | 11/2000 | Tracy et al. |
| 6,169,964 B1 | 1/2001 | Aisa et al. |
| 6,177,739 B1 | 1/2001 | Matsudaira et al. |
| 6,181,985 B1 | 1/2001 | O'Donnell et al. |
| 6,195,018 B1 | 2/2001 | Ragle et al. |
| 6,216,956 B1 | 4/2001 | Ehlers et al. |
| 6,295,272 B1 | 9/2001 | Feldman et al. |
| 6,301,674 B1 | 10/2001 | Saito et al. |
| 6,329,616 B1 | 12/2001 | Lee |
| 6,369,643 B1 | 4/2002 | Lee et al. |
| 6,426,947 B1 | 7/2002 | Banker et al. |
| 6,487,509 B1 | 11/2002 | Aisa |
| 6,493,643 B1 | 12/2002 | Aisa |
| 6,519,509 B1 | 2/2003 | Nierlich et al. |
| 6,583,521 B1 | 6/2003 | Lagod et al. |
| 6,587,739 B1 | 7/2003 | Abrams et al. |
| 6,590,304 B1 | 7/2003 | Manning et al. |
| 6,621,179 B1 | 9/2003 | Howard |
| 6,622,925 B2 | 9/2003 | Carner et al. |
| 6,624,532 B1 | 9/2003 | Davidow et al. |
| 6,631,622 B1 | 10/2003 | Ghent et al. |
| 6,633,823 B2 | 10/2003 | Bartone et al. |
| 6,681,154 B2 | 1/2004 | Nierlich et al. |
| 6,681,248 B1 | 1/2004 | Sears et al. |
| 6,711,632 B1 | 3/2004 | Chow et al. |
| 6,718,214 B1 | 4/2004 | Schoettle et al. |
| 6,741,442 B1 | 5/2004 | McNally et al. |
| 6,744,150 B2 | 6/2004 | Rendic |
| 6,745,106 B2 | 6/2004 | Howard et al. |
| 6,751,562 B1 | 6/2004 | Blackett et al. |
| 6,795,707 B2 | 9/2004 | Martin et al. |
| D499,174 S | 11/2004 | Goetz et al. |
| 6,839,717 B1 | 1/2005 | Motoyama et al. |
| 6,847,614 B2 | 1/2005 | Banker et al. |
| 6,861,621 B2 | 3/2005 | Ghent |
| 6,883,065 B1 | 4/2005 | Pittelkow et al. |
| 6,891,478 B2 | 5/2005 | Gardner |
| 6,904,385 B1 | 6/2005 | Budike, Jr. |
| 6,931,003 B2 | 8/2005 | Anderson |
| 6,940,272 B2 | 9/2005 | Niv |
| 6,961,642 B2 | 11/2005 | Horst |
| 6,988,375 B2 | 1/2006 | Bashark |
| 6,996,115 B1 | 2/2006 | Budde et al. |
| 6,996,741 B1 | 2/2006 | Pittelkow et al. |
| 7,003,688 B1 | 2/2006 | Pittelkow et al. |
| 7,034,707 B2 | 4/2006 | Aisa |
| 7,043,663 B1 | 5/2006 | Pittelkow et al. |
| 7,058,524 B2 | 6/2006 | Hayes et al. |
| 7,069,468 B1 | 6/2006 | Olson et al. |
| 7,110,832 B2 | 9/2006 | Ghent |
| 7,117,051 B2 | 10/2006 | Landry et al. |
| 7,127,633 B1 | 10/2006 | Olson et al. |
| 7,134,011 B2 | 11/2006 | Fung |
| 7,136,927 B2 | 11/2006 | Traversat et al. |
| 7,165,107 B2 | 1/2007 | Pouyoul et al. |
| 7,171,475 B2 | 1/2007 | Weisman et al. |
| 7,280,893 B2 | 10/2007 | Spool et al. |
| 7,324,876 B2 | 1/2008 | Ying |
| 7,447,760 B2 * | 11/2008 | Forth et al. ............... 709/223 |
| 2001/0025392 A1 | 10/2001 | Youn et al. |
| 2001/0049846 A1 | 12/2001 | Guzzi et al. |
| 2002/0019758 A1 | 2/2002 | Scarpelli |
| 2002/0019802 A1 | 2/2002 | Malme et al. |
| 2002/0161552 A1 | 10/2002 | Ryu |
| 2003/0036822 A1 | 2/2003 | Davis et al. |
| 2003/0040813 A1 | 2/2003 | Gonzales et al. |
| 2003/0055776 A1 | 3/2003 | Samuelson |
| 2003/0168389 A1 | 9/2003 | Astle et al. |
| 2003/0187550 A1 | 10/2003 | Wilson et al. |
| 2003/0225483 A1* | 12/2003 | Santinato et al. ............. 700/295 |
| 2003/0233201 A1 | 12/2003 | Horst et al. |
| 2004/0031038 A1 | 2/2004 | Hugly et al. |
| 2004/0043754 A1 | 3/2004 | Whewell |
| 2004/0046454 A1 | 3/2004 | Kang |
| 2004/0057455 A1 | 3/2004 | Choi |
| 2004/0078154 A1 | 4/2004 | Hunter |
| 2004/0083112 A1 | 4/2004 | Horst |
| 2004/0133314 A1 | 7/2004 | Ehlers et al. |
| 2004/0153170 A1 | 8/2004 | Santacatterina et al. |
| 2004/0172587 A1 | 9/2004 | Lawlor |
| 2004/0235451 A1 | 11/2004 | Whewell et al. |
| 2004/0260407 A1 | 12/2004 | Wimsatt |
| 2005/0011886 A1 | 1/2005 | Kim |
| 2005/0018612 A1 | 1/2005 | Fitzgerald |
| 2005/0103466 A1 | 5/2005 | Landry et al. |
| 2005/0116543 A1 | 6/2005 | Merdjan |
| 2005/0251604 A1 | 11/2005 | Gerig |
| 2005/0258961 A1 | 11/2005 | Kimball et al. |
| 2005/0280969 A1 | 12/2005 | Reynolds |
| 2005/0280970 A1 | 12/2005 | Reynolds |
| 2006/0009861 A1 | 1/2006 | Bonasia et al. |
| 2006/0010453 A1 | 1/2006 | Illowsky et al. |
| 2006/0015299 A1 | 1/2006 | McDermott et al. |
| 2006/0060512 A1 | 3/2006 | Astle et al. |
| 2006/0092865 A1 | 5/2006 | Corday et al. |
| 2006/0095164 A1* | 5/2006 | Donnelly et al. ............. 700/295 |
| 2006/0117491 A1 | 6/2006 | Kim |
| 2006/0120302 A1 | 6/2006 | Poncini et al. |
| 2006/0123124 A1 | 6/2006 | Weisman et al. |
| 2006/0123125 A1 | 6/2006 | Weisman et al. |
| 2006/0125422 A1* | 6/2006 | Costa ............... 315/294 |
| 2006/0168159 A1 | 7/2006 | Weisman et al. |
| 2006/0168269 A1 | 7/2006 | Sather et al. |
| 2006/0175903 A1 | 8/2006 | Palmer et al. |
| 2006/0184661 A1 | 8/2006 | Weisman et al. |
| 2006/0190266 A1 | 8/2006 | Tanigawa et al. |
| 2006/0200255 A1 | 9/2006 | Cenedese et al. |

| | | | |
|---|---|---|---|
| 2007/0129812 | A1 | 6/2007 | Ferchau |
| 2007/0129813 | A1 | 6/2007 | Ferchau |
| 2007/0130278 | A1 | 6/2007 | Baek et al. |
| 2007/0160022 | A1 | 7/2007 | McCoy et al. |
| 2008/0272934 | A1* | 11/2008 | Wang et al. .............. 340/870.11 |

FOREIGN PATENT DOCUMENTS

| | | |
|---|---|---|
| DE | 4023846 A1 | 4/1992 |
| DE | 4124650 A1 | 1/1993 |
| DE | 195 41 869 C1 | 1/1997 |
| DE | 19824168 A1 | 12/1999 |
| EP | 0 620 631 A1 | 10/1994 |
| EP | 0620631 A1 | 10/1994 |
| EP | 1028604 A2 | 8/2000 |
| EP | 1351447 A1 | 10/2003 |
| EP | 1640824 A1 | 3/2006 |
| KR | 10-2002-0006809 A | 1/2002 |
| KR | 10-2003-0035228 A | 5/2003 |
| KR | 10-2005-0066456 A | 6/2005 |
| KR | 10-2005-0068297 A | 7/2005 |
| WO | 02/27687 A1 | 4/2002 |
| WO | 03/094321 A1 | 11/2003 |
| WO | 2005/109135 A1 | 11/2005 |
| WO | 2006/014504 A2 | 2/2006 |
| WO | 2006/135726 A2 | 12/2006 |
| WO | 2006/135758 A1 | 12/2006 |

OTHER PUBLICATIONS

Asian Electronics Ltd., Glossary, 2003, pp. 1-6.
http://www.hrm.uh.edu/docs/pdf/Nextel%20Plans.pdf.
Merriam Webster's Dictionary of Synonyms, 1984, Merriam-Webster, Incorporated, p. 13.
"Utility Control Algorithm", Jan. 1, 1986, vol. 28, issue 8, pp. 3657-3660.
U.S. Appl. No. 10/460,885, filed Jun. 13, 2003; Total Home Energy Management; first named inventor Gale Richard Horst.
U.S. Appl. No. 10/280,902, filed Oct. 25, 2002; Method and Apparatus for Managing Resources of Utility Provider; first named inventor Gale R. Horst.
U.S. Appl. No. 10/757,891, filed Jan. 15, 2004; A Process for Managing and Curtailing Power Demand of Appliances and Components Thereof, and System Using Such Process; first named inventor Gianpiero Santacatterina.
U.S. Appl. No. 11/733,385, filed Apr. 10, 2007; Energy Management System and Method; first named inventor Gale R. Horst.

* cited by examiner

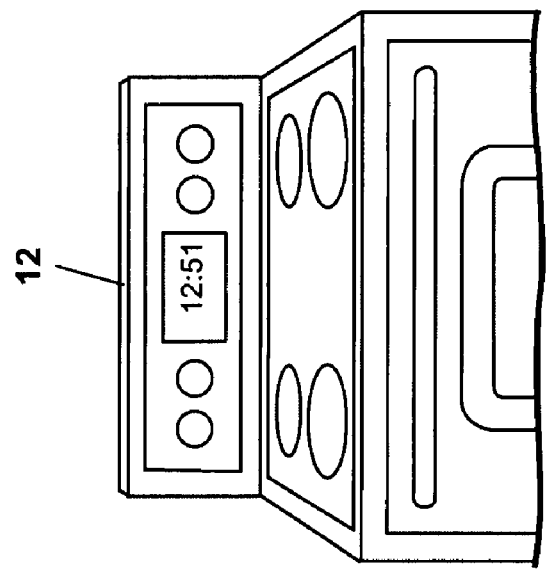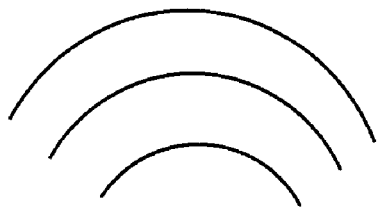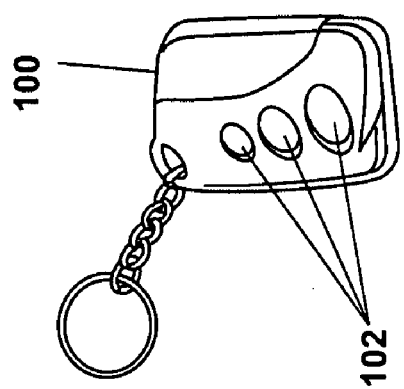
Fig. 16

NETWORK FOR CHANGING RESOURCE CONSUMPTION IN AN APPLIANCE

REFERENCE TO RELATED APPLICATION

This application is a continuation-in-part of International Application No. PCT/US2006/022503, filed Jun. 9, 2006, which claims the benefit of U.S. Provisional Patent Application No. 60/595,148, filed Jun. 9, 2005, both of which are incorporated by reference.

BACKGROUND OF THE INVENTION

1. Field of the Invention

The invention relates to components and accessories for a communicating appliance and more particularly, to a network for changing the resource consumption of an appliance.

2. Description of the Related Art

Household appliances typically comprise one or more components responsible for the electromechanical operations of the appliance. For example, an oven can include an appliance management component having a printed circuit board (PCB) with memory, as well as a user-interface component, such as a control panel or keypad, for a user to issue commands to the oven. As another example, a washing machine can include an appliance management component, a user-interface component, and a motor control component that controls a motor of the washing machine.

Typically, discrete circuits couple the internal components of an appliance, with each discrete circuit responsible for individual communication between related components. The circuits communicate with each other over an internal network that traditionally is implemented by hard-wired ribbon cables or other connectors or harnesses between the components. The hard-wired connectors form a closed system or network that is difficult or not possible to modify. For example, because the closed network relies on hard-coded or hard-wired network solutions, it is not practical to couple additional external components or additional internal components to the appliance to expand the capability or function of the appliance. The closed network cannot easily be adapted for communication with the additional external/internal components and therefore limits the potential of the appliance.

SUMMARY OF THE INVENTION

A network includes a smart coupler having a processor, a memory with software, and a power source to energize the processor and the memory and an appliance configured to perform an operation on a physical article. The appliance consumes at least some of a resource in performing the operation. The network also includes a source of information about the resource. According to the invention, the smart coupler is in communication with the appliance and the source, and the processor and memory operate to request a change to the operation of the appliance in response to a resource parameter or a request communicated by the source.

The smart coupler itself can be the source of information, and the appliance can also be the source of information. Typical resources include electricity, hot water, gray water, gas, water, replaceable parts, and consumables. The communication can be wireless.

The resource parameter be, for example, a measure of the resource greater than a threshold or less than a threshold. The request can be to reduce consumption of the resource, to delay consumption of the resource, and to halt consumption of the resource.

In one aspect of the invention, the coupler includes a visual indicator that communicates information about the appliance. The Information can be the type of information that is licensable. Preferably, the visual indicator is a tricolor LED. The visual indicator can include a light diffuser. As well, the visual indicator can also communicate information about the coupler.

In another aspect, the software enables the coupler to selectively couple a remote client to the appliance to enable communication between the client and the appliance. In this way, the client can request data collection or a change in the operation of the appliance. The network can also include a GFA sensor to provide data to the processor for determining the request to the appliance. The appliance can have a user interface, in which case, the appliance or the coupler can have software to affect the operation so that a user can actuate the software by way of the user interface to affect the operation in response to a request. Preferably, the user interface is graphical.

In a further aspect of the invention, the processor and memory operate to send a message containing the information about the resource to the appliance for communication to a user by the user interface. And in yet a further aspect, a network has an appliance configured to perform an operation on a physical article where the appliance consumes at least some of a resource in performing the operation. The network also has a source of information about the resource, and first and second smart couplers each having a processor, a memory with software, and a power source to energize the processor and the memory. The first smart coupler is coupled to the source in a first network. The second smart coupler is coupled to the first smart coupler in a second network, and also coupled to the appliance in a third network. At least two networks are of different types. The software is configured to communicate the information across the three networks.

BRIEF DESCRIPTION OF THE DRAWINGS

In the drawings:

FIG. 16 is a schematic view of a network binder according to one embodiment of the invention for use with a communicating appliance.

DESCRIPTION OF EMBODIMENTS OF THE INVENTION

Figure 1:
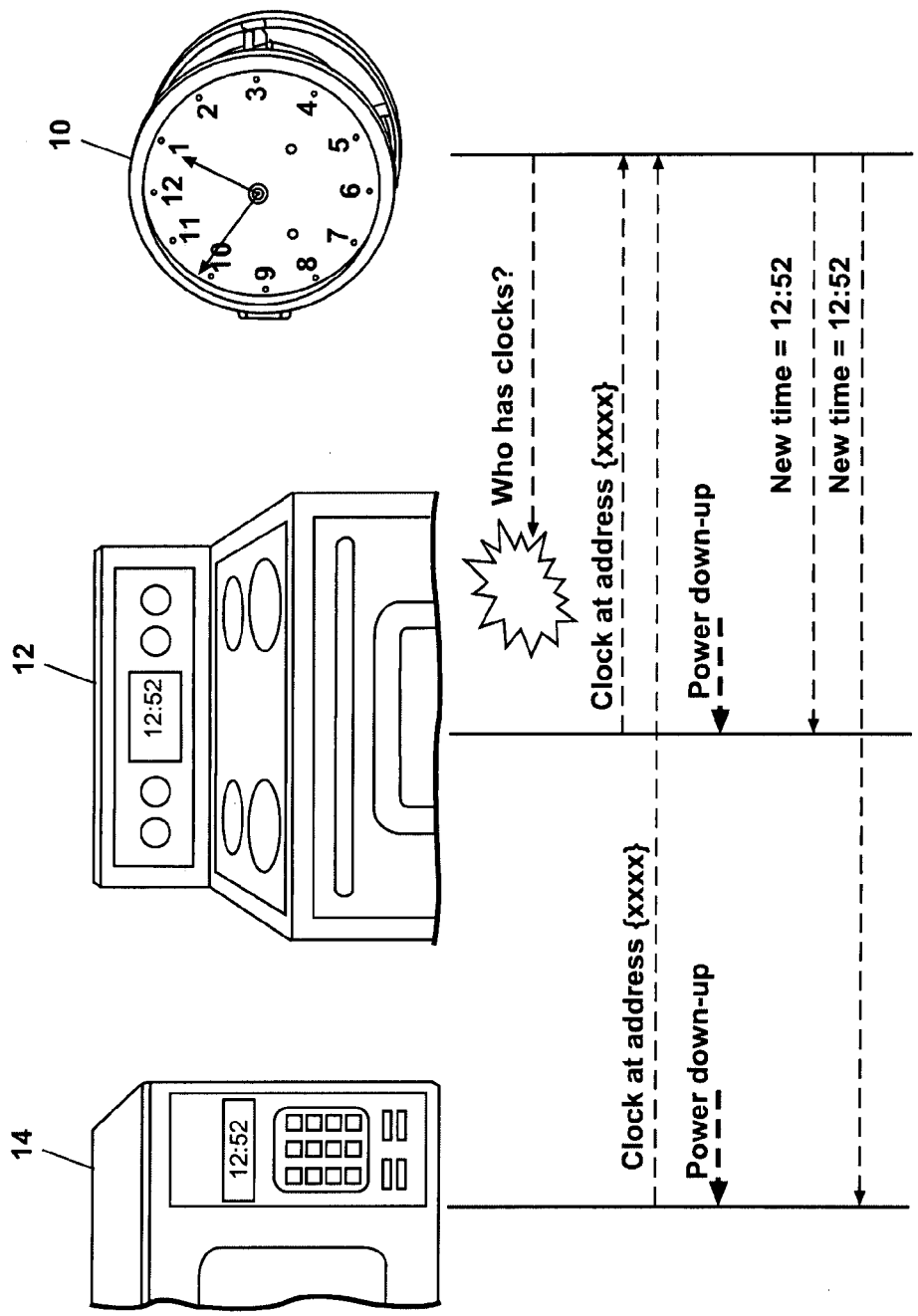
FIG. 1 is a schematic view of a clock accessory for a communicating appliance according to one embodiment of the invention, wherein the clock communicates a time to appliances following powering the appliances down and up.

By employing a software architecture that enables facile communication between internal components of an appliance and between an external component and one or more of the internal components of the appliance, various components and accessories can communicate with the appliance to expand the capability, functionality, and usability of the appliance. The appliance can be any suitable appliance, such as a household appliance. Examples of household appliances include, but are not limited to, clothes washing machines, clothes dryers, ovens, dishwashers, refrigerators, freezers, microwave ovens, trash compactors, and countertop appliances, such as waffle makers, toasters, blenders, mixers, food processors, coffee makers, and the like.

The appliance can be configured to perform a cycle of operation to complete a physical domestic operation on an article. Examples of the physical domestic operations include a food preparation operation, a food preservation operation, a fluid treatment operation, a cleaning operation, a personal care operation, a fabric treatment operation, an air treatment operation, and a hard surface treatment operation. The air treatment operation can comprise, for example, air purification, air humidification, air dehumidification, air heating, and air cooling. The food preparation operation can comprise, for example, food cleaning, food chopping, food mixing, food heating, food peeling, and food cooling. The food preservation operation can comprise, for example, food cooling, food freezing, and food storage in a specialized atmosphere. The fluid treatment operation can comprise, for example, fluid heating, fluid boiling, fluid cooling, fluid freezing, fluid mixing, fluid whipping, fluid dispensing, fluid filtering, and fluid separation. The cleaning operation can comprise, for example, dishwashing, fabric washing, fabric treatment, fabric drying, hard surface cleaning, hard surface treatment, hard surface drying, carpet cleaning, carpet treatment, and carpet drying. The personal care operation can comprise, for example, hair treatment, nail treatment, body massaging, teeth cleaning, body cleaning, and shaving.

The internal components of the appliances can include any component that participates in the operation of the appliance. Some of the internal components have a corresponding controller (main controller, motor controller, user interface, etc.), which can be a simple microprocessor mounted on a printed circuit board, and other components that have no controller. The components can comprise one or more devices that are controlled by the controller. Typically, the controller components in cooperation either directly or indirectly, through other components, control the operation of all of the components and the associated devices to implement an operation or cycle for the appliance.

The software architecture can be implemented on and communicate over an internal communications network on the appliance. The internal communications network connects the various internal components of the appliance and can be considered a closed network. One example of the internal communications network used within the appliance is the WIDE network protocol, created by Whirlpool, Inc., the assignee of the present patent application.

The software architecture expands the communication ability of the appliance by effectively creating an open network, hereinafter referred to as "network." Within the appliance, the software architecture can, but does not have to, reside on each of the components that have a controller. Those components with the software architecture form a network node that can communicate with the other nodes.

The software architecture can perform multiple functions. For example, one function can relate to identifying each of the components corresponding to a node on the network, while another function can relate to identifying capabilities or functions of the identified components on the network. Yet another exemplary function is to identify the status of the components on the network. In this way, the software architecture can function to inform all of the nodes on the network of the presence, capabilities, and status of the other nodes.

The software architecture can comprise multiple modules, each of which has different functionality. Various combinations of the modules or all of the modules can reside on each of the components. One module having a basic or core functionality resides on all of the components. In one anticipated configuration, all of the modules reside at least on the main controller, which establishes the main controller to function as a primary or main software architecture, with the other nodes functioning in a client relationship to the main software architecture. In such a configuration, all of the nodes can communicate through the main software architecture. The software architecture can be sufficiently robust that it can permit configurations without a main software architecture or with multiple main software architectures. For example, the controllers of the various components can work together to control the operation of the appliance without any one of the appliances functioning as a main controller. Regardless of the configuration, any component with the software architecture can function as a client with respect to the other components.

Because of the software architecture, the internal components of the appliance are not only connected with one another, but the internal components can also be connected to one or more external components or a new internal component through the network. The external component and/or the new internal component has one, some, or all of the software architecture modules in resident. As a result, the external component and/or the new internal component can communicate with the internal components of the appliance and can also communicate with other external components having the software architecture.

The software architecture can be any suitable software architecture that enables communication between the internal components of the appliance and the external component and/or the new internal component or between components external to the appliance. An example of the software architecture is disclosed in International Application No. PCT/US2006/022420, titled "SOFTWARE ARCHITECTURE SYSTEM AND METHOD FOR COMMUNICATION WITH, AND MANAGEMENT OF, AT LEAST ONE COMPONENT WITHIN A HOUSEHOLD APPLIANCE," filed Jun. 8, 2006, and incorporated herein by reference in its entirety. A related example is shown in priority document U.S. Patent Application No. 60/595,148, filed Jun. 9, 2005. All of the communications between components and accessories and/or any combination of components and accessories described in this application can be implemented by the software and network structures disclosed in either of these applications.

The software architecture disclosed in the aforementioned references can be implemented by providing one or more of the software elements of the software architecture at least on each of the components to be controlled and on the accessory. The software architecture is configured to generate a plurality of messages, with at least one of the software elements residing in each of the components and in the accessory and configured to enable transmission of at least one of the plurality of messages between the components and between the accessory and the components. The messages can be transmitted for bi-directional communication between components and/or components and accessory. The messages can include command messages that are used to implement a physical domestic operation cycle of the appliance.

The messages can be generated by a message generator, which can take the form of the software architecture, the accessory, or a component. One possible message generator is a user interface.

Descriptions of several examples of components and accessories, herein after referred to as "accessory" with it being understood that the accessory can be considered a component on the network, for use in conjunction with the appliance having the software architecture follow. The accessories can be external to the appliance or internal to the appliance. Each of the accessories is enabled with the software architecture whereby the accessory establishes a node on the network or is part of an existing node on the network.

One example of the accessory is a clock. In one embodiment, the clock is external to the appliance and is an atomic clock. For example, the atomic clock can be a wireless atomic clock that can communicate with one or more of the appliances. An illustration of this embodiment is shown in FIG. 1, where a clock 10 can communicate with a first appliance 12 in the form of an oven and a second appliance 14 in the form of a microwave oven.

The clock can acquire an official time via any suitable method, such as from a cellular network, a radio network, or the Internet. The clock can then transmit the official time to the appliance(s). For example, the clock can automatically transmit the official time, transmit the official time based on registered time events (i.e., transmit the official time at predetermined intervals to appliances that have registered for the time events), or transmit the official time upon request from one or more of the appliances.

An example of transmitting the time is shown in FIG. 1. The clock 10 communicates with the first and second appliances 12, 14 on the network and asks for identification of the appliances that have clocks. The first and second appliances 12, 14 both respond by informing the clock 10 that the first appliance 12 and the second appliance 14 each have a clock and provide corresponding addresses for the respective clocks. An event occurs where the first and second appliances 12, 14 are powered down (i.e., off) and up (i.e., on) such that the time on the first and second appliances 12, 14 is no longer set. The clock 10 then transmits the official time to the clocks of each of the first and second appliances 12, 14, and the clock 10, the first appliance 12, and the second appliance 14 all display the same official time.

Figure 2:
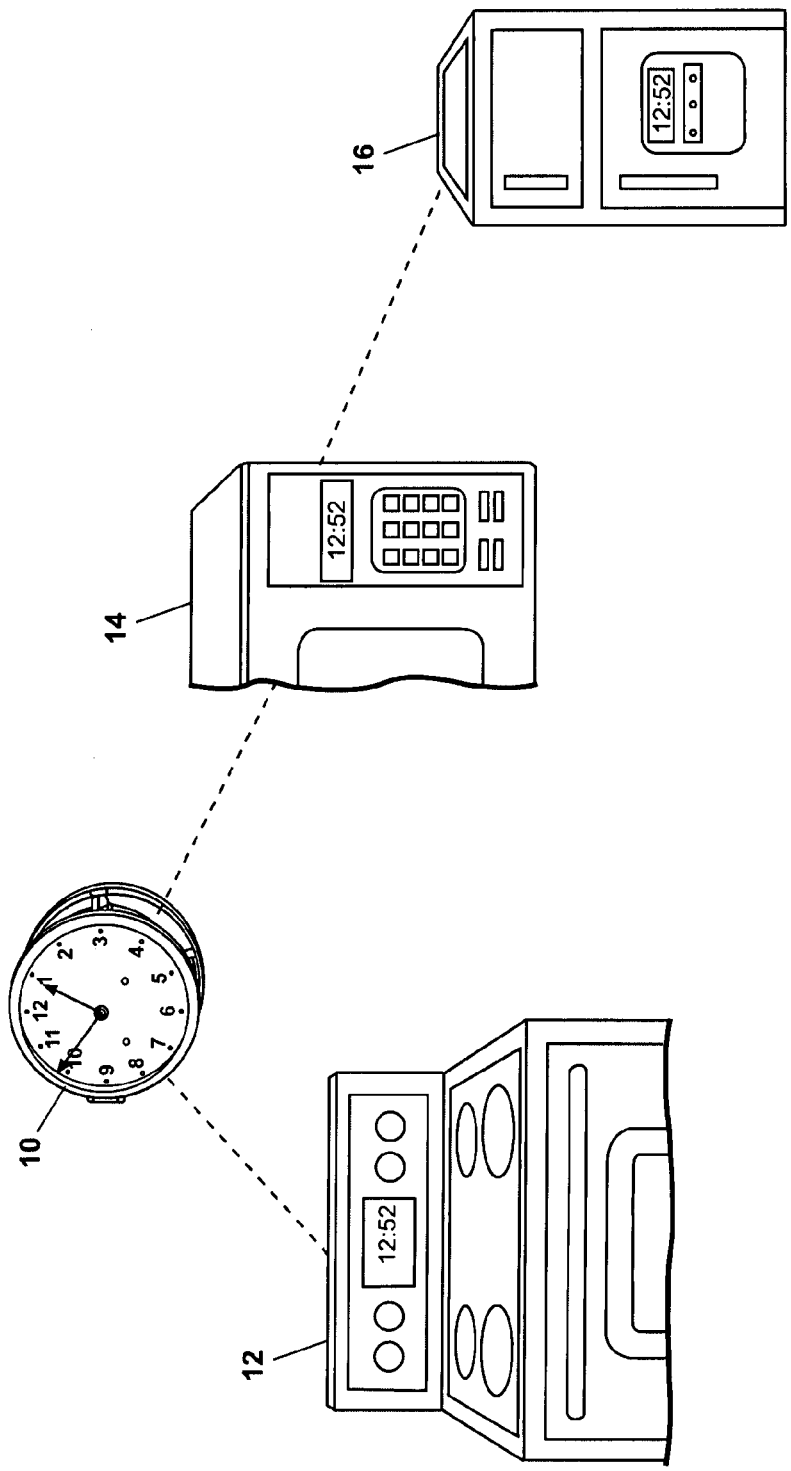
FIG. 2 is a schematic view of a clock accessory for a communicating appliance according to another embodiment of the invention, wherein the clock functions as an amplifier and/or a wireless access point.

The clock can also function as an amplifier to boost a signal provided by the appliance to a destination appliance or as a wireless access point that can transmit a signal provided by the appliance to a destination appliance. For example, the appliance can have a radio that is not sufficiently strong to provide visibility to the destination appliance but is strong enough to provide visibility to the clock. The clock can receive the signal from the appliance and re-broadcast the signal to a destination appliance or to another appliance that can transmit the signal to the destination appliance, and so on. The clock can amplify the signal prior to or while re-broadcasting the signal, or the clock can simply re-broadcast the signal. An example of utilizing the clock in this manner is illustrated in FIG. 2. The first appliance 12 in the form of the oven has visibility to the clock 10 and sends a signal to the clock 10. The clock 10 can optionally amplify the signal before or while re-broadcasting the signal to the second, destination appliance 14 in the form of the microwave oven. In another scenario, where the destination appliance is a third appliance 16 in the form of a refrigerator, the second appliance 14 can send the signal to the third appliance 16.

The clock can optionally serve as a protocol bridge. A protocol is a standard procedure for regulating data transmission between devices; however, not all devices necessarily communicate in the same protocol. A bridge effectively translates one protocol into another so that devices with different protocols can communicate with one another. The clock, therefore, can function not only as a time-keeping apparatus but also as a bridge between appliances or between the appliance and another device. Thus, the bridge functionality can be incorporated into the clock and the user does not need to purchase a separate bridge. The amplifier and bridging functions can also be included in any of the other accessories described below.

Figure 3:
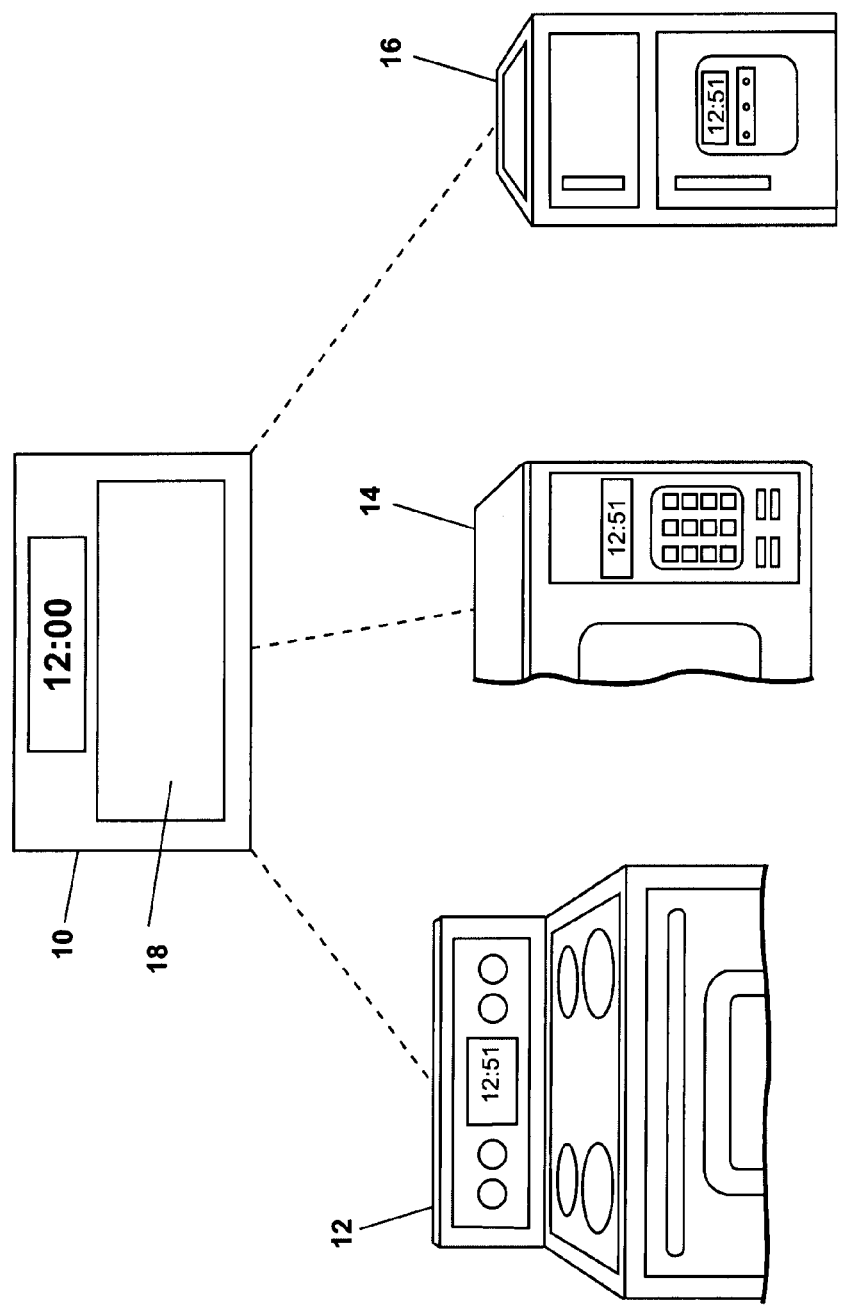
FIG. 3 is a schematic view of a clock accessory for a communicating appliance according to another embodiment of the invention, wherein the clock comprises a display for communication with a user of the communicating appliance.

Referring now to FIG. 3, the clock 10 that communicates with the appliance(s) 12, 14, 16, can include a display 18 for communication with the user. The display 18 can be integrated with a time display or can be separate from the time display. As examples, the display 18 can be a liquid crystal display (LCD), a plasma display, a digital display, and the like. The display 18 can communicate to the user a status of the appliance, such as via one or more notification icons. Examples of appliance status include, but are not limited to, laundry washing complete, laundry drying complete, laundry off balance, microwave food defrosted, turn defrosting food in microwave, microwave food ready, oven pre-heat complete, oven food ready, boil over on cooktop, fire, hot water ready, and coffee ready. The relevant notification icons can become illuminated, such as by flashing or being constantly illuminated, or otherwise visible when appropriate and become un-illuminated or otherwise not visible when appropriate.

The clock 10 can further have the capability of communicating to the user, such as via the display 18, an alert status of the appliance(s) 12, 14, 16 with which the clock 10 communicates, and, optionally, the user can acknowledge receipt of the alert status, such as via the display 18. According to one embodiment, the acknowledgement by the user can clear the alert status from the clock 10 and the appliance(s) 12, 14, 16. In this manner, the display 18 can function as a user interface that effects communication not only to the user from the appliance but also from the user to the appliance.

With continued reference to FIG. 3, the clock 10 can optionally incorporate appliance control capability whereby the user can provide control inputs or commands to the appliance(s) 12, 14, 16 through the clock 10, such as via the display 18. Exemplary commands include, but are not limited to, start/stop wash cycle, start/stop drying cycle, start/stop cooking program, decrease heating element power for simmer, execute low heat tumble following drying cycle, decrease microwave heating power, increase temperature of chill zone in refrigerator, and the like.

If the clock on the network does not have electronics for functioning as an atomic clock, the clock can be a satellite clock that can receive time from an atomic clock enabled to speak "TimeCast" protocol. Thus, the clock can display the time given by the atomic clock through TimeCast.

The clock can be internal to the appliance, as described above, or can be external to the appliance. When the clock is internal to the appliance, electronics for the clock can be packaged into the appliance during manufacture of the appliance or can be installed into the appliance as an after-market accessory. The clock as an internal accessory can have any of the functionalities described above for the external clock. The clock can also be "plugged" into an appropriate connector on the appliance. The connector can provide both power and data communication.

Figure 4:
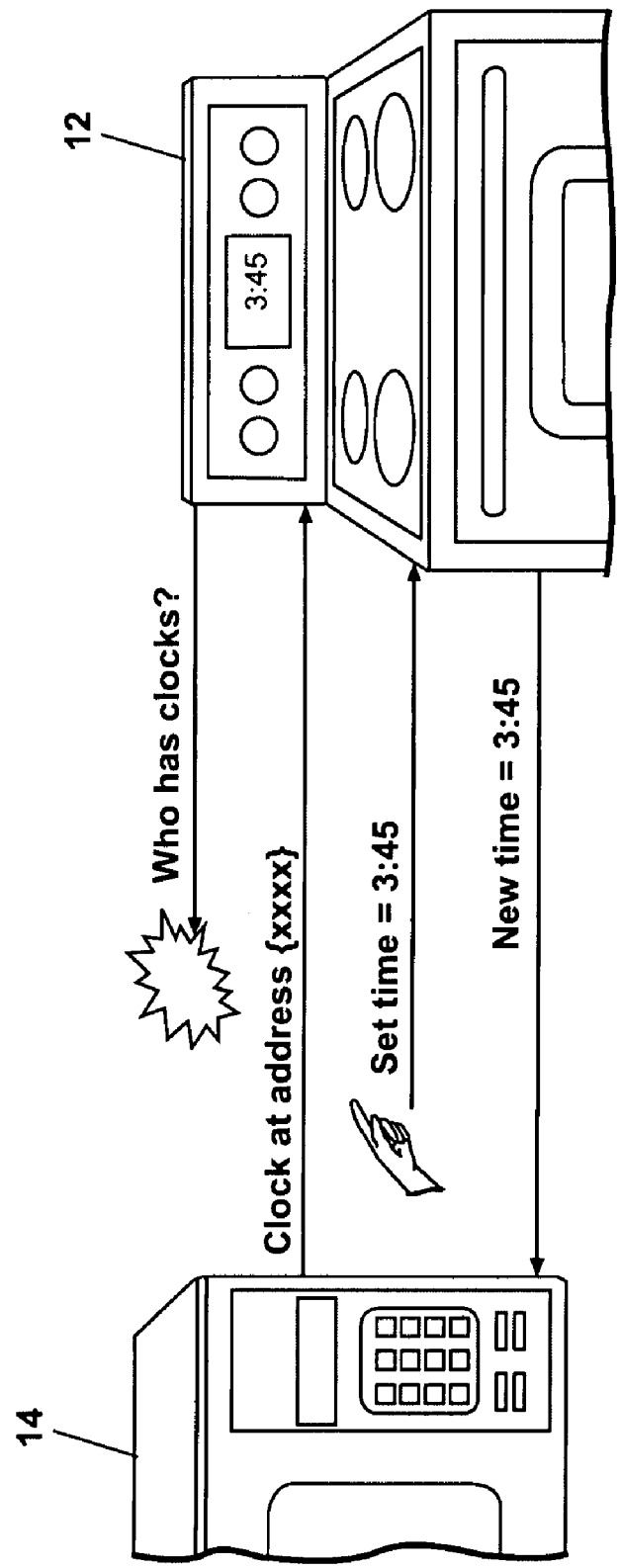
FIG. 4 is a schematic view of a clock accessory for a communicating appliance according to another embodiment of the invention, wherein the clock communicates a time to other appliance to synchronize the time among the appliances.

The clock conventionally associated with the appliance can also function as an accessory. For example, the clock of the appliance can communicate with clocks of other appliances, such as for synchronization of the clocks to establish and/or maintain consistent time among all of the appliances. An example of clock synchronization is illustrated in FIG. 4. The first appliance 12 broadcasts a message requesting identification of appliances having clocks. The second appliance 14 responds by informing the first appliance 12 that the second appliance 14 has a clock and provides an address for the clock. Thus, the first appliance 12 has established the appliances that have clocks. In the future, the user can set the time on the first appliance 12, and the first appliance 12 can then broadcast the set time to the appliances that have clocks, such as the second appliance 14. Alternatively, the user can set the time on the clock of another appliance, which can transmit the set time to the first appliance 12 and the second appliance 14. As a result of this process, the user need only set the time on one of the appliances as the clocks of the other appliances automatically synchronize with the clock having the set time. Such a configuration can be especially beneficial in situations, such as a power outage, where multiple clocks on the appliances lose power and, therefore, the time.

Figure 5:
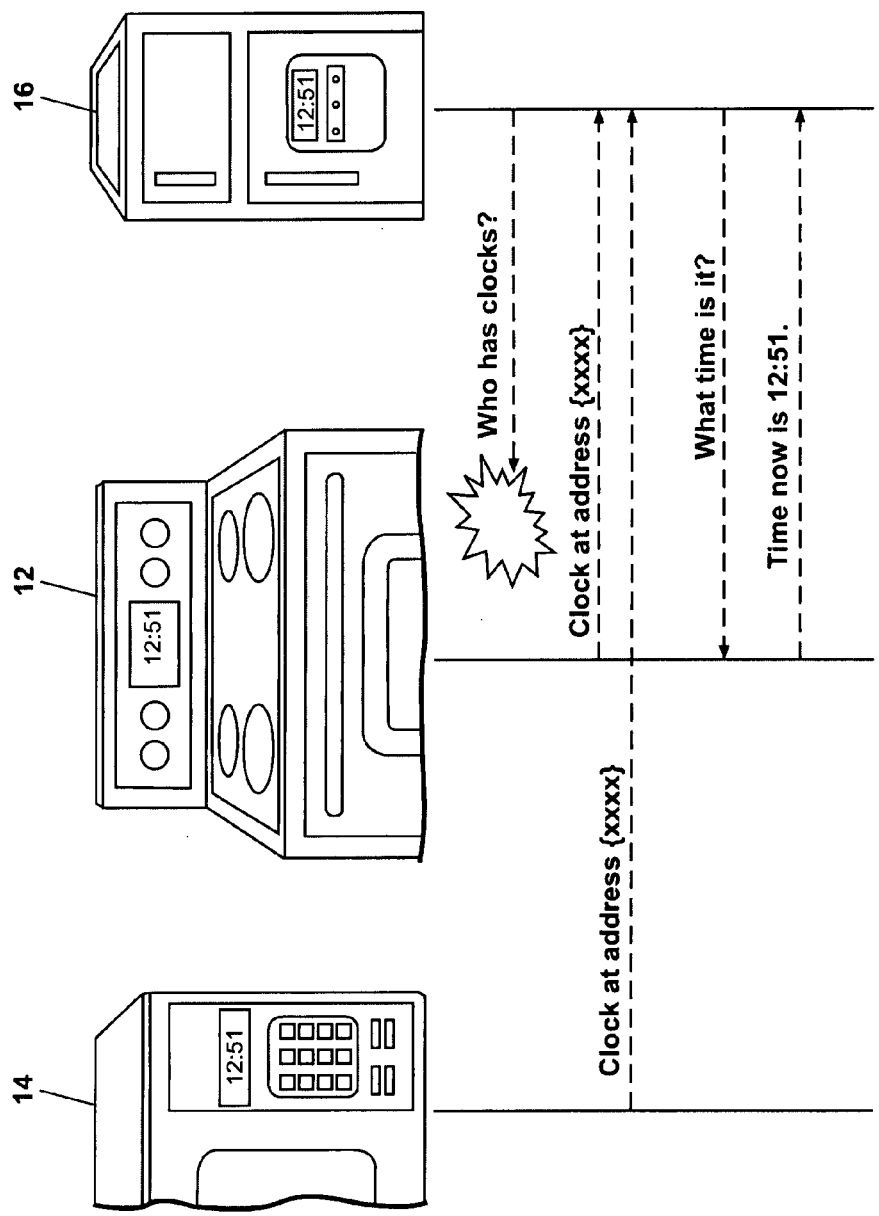
FIG. 5 is a schematic view of a clock accessory for a communicating appliance according to another embodiment of the invention, wherein the clock on one appliance requests a time from a clock on another appliance to synchronize the time among the appliances.

Another example of clock synchronization is shown schematically in FIG. 5. In this example, the appliance requests the time from another appliance. The third appliance 16 broadcasts a message requesting identification of appliances having clocks. The first appliance 12 responds by informing the third appliance 16 that the first appliance 12 has a clock and provides an address for the clock. Similarly, the second appliance 14 responds by informing the third appliance 16 that the second appliance 14 has a clock and provides an address for the clock. Thus, the third appliance 16 has established the appliances that have clocks. The third appliance 16 then communicates with at least one of the appliances having a clock, which is shown as the first appliance 12 in FIG. 5, and requests the time from the first appliance 12. The first appliance 12 responds by providing the time to the third appliance 16. Alternatively, the third appliance 16 can request the time from another of the appliances, such as the second appliance 14.

The clocks of the appliances can also synchronize by one of the appliances broadcasting the time at periodic intervals. When the clocks are synchronized in this manner, each minute rollover of the time can be synchronized so that there is no discrepancy between the times on the clocks, even while the displayed time is changing.

Another example of an accessory is a cooking aid. The cooking aid can be an active accessory, a sensing accessory, or a combination thereof. The active accessory can be programmed by the user or can receive commands from the appliance for performing an action. The sensing accessory can include one or more sensors that detects a state of the accessory and/or appliance and communicates the state to the appliance or other component on the network.

Figure 6:
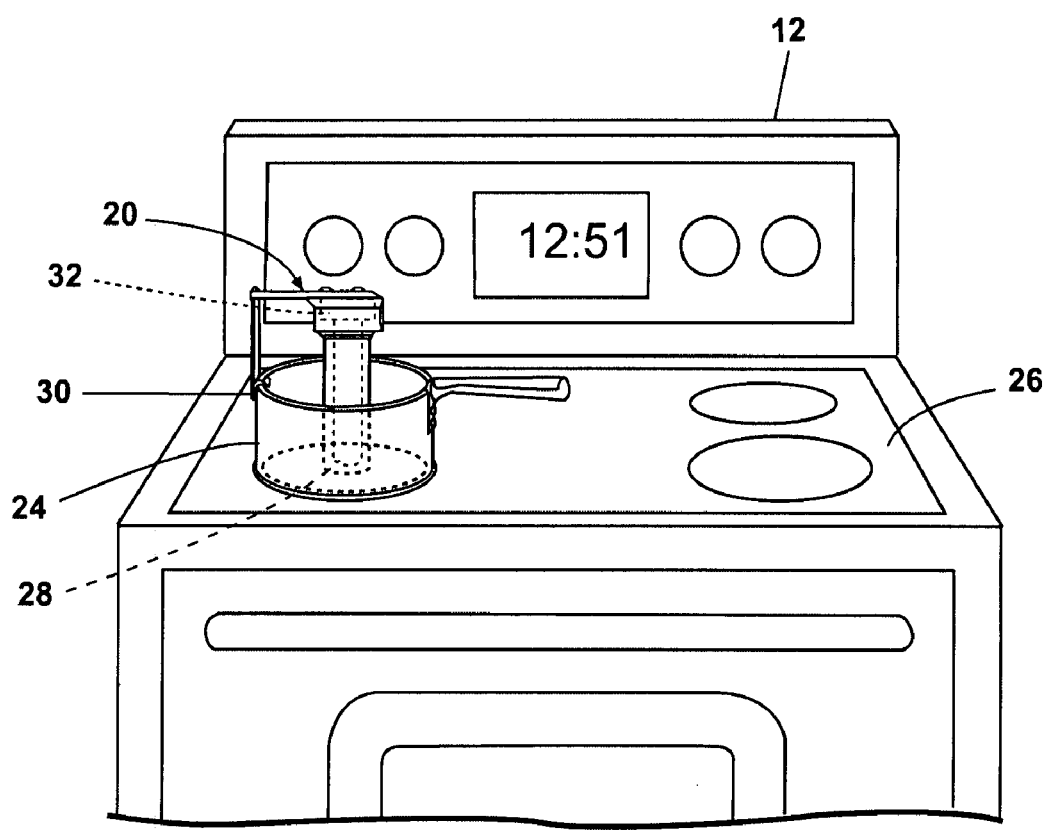
FIG. 6 is a schematic view of a cooking aid accessory in the form of a controlled stirrer according to one embodiment of the invention for use with a communicating appliance.

Exemplary active cooking aids include a controlled stirrer 20 and an ingredient dispenser 122, which can both be associated with the first appliance 12 in the form of the oven. As shown in FIG. 6, the controlled stirrer 20 can be coupled to a cooking vessel 24, such as a pot or pan, located on a cooktop 26 of the first appliance 12. Alternatively, the controlled stirrer 20 can be coupled to the first appliance 12, such as to the cooktop 26, rather than to the cooking vessel 24. The controlled stirrer 20 includes a stirring mechanism 28, such as an auger, that can induce movement of material (i.e., food) within the cooking vessel 24, and a mount 30 for coupling the stirring mechanism 28 to the cooking vessel 24 or the first appliance 12. The controlled stirrer 20 has a controller 32 that can communicate with the cooktop 26 or other part of the first appliance 12 for receiving stirring commands. The commands can be associated with a recipe, such as a recipe stored within the first appliance 12 or a recipe otherwise visible to the first appliance 12, such as via another component on the network. Alternatively, the user can program the controlled stirrer 20 according to desired actions or a recipe. The stirring commands can include information such as start stirring, stop stirring, stirring speed, and stirring frequency. In an alternative embodiment, the controlled stirrer 20 can be integrated with the cooking vessel 24. Regardless of the configuration of the controlled stirrer 20, employing the controlled stirrer 20 eliminates or reduces the need for the user to be present at the second appliance 12 to stir the material in the cooking vessel 24. The controlled stirrer 20 is especially beneficial when a recipe requires continuous stirring of the material for a relatively long period of time.

Figure 7:
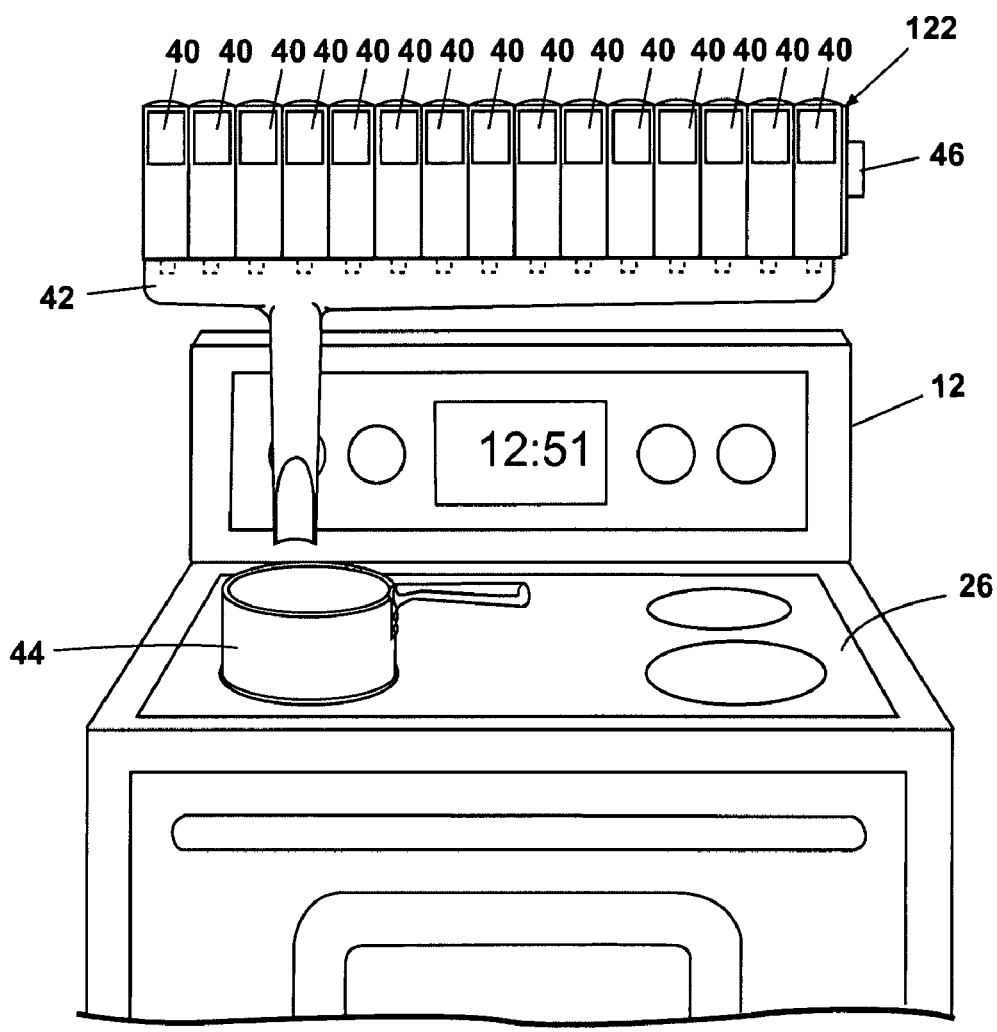
FIG. 7 is a schematic view of a cooking aid accessory in the form of an ingredient dispenser according to one embodiment of the invention for use with a communicating appliance.

Referring now to FIG. 7, the ingredient dispenser 122 can be mounted to or located in the vicinity of the first appliance 12 and can include one or more compartments 40 configured to store ingredients. The compartments 40 couple with corresponding dispensing mechanisms 42 configured to transport the ingredients from the compartments 40 to a cooking vessel 44, such as a pot or pan. The cooking vessel 44 can be intended for use on the cooktop 26 or inside the first appliance 12. The ingredient dispenser 122 further includes a controller 46 that can communicate with the first appliance 12 for receiving commands related to dispensing the ingredients. The commands can be associated with a recipe, such as a recipe stored within the first appliance 12 or a recipe otherwise visible to the first appliance 12, such as via another component on the network. Alternatively, the user can program the ingredient dispenser 122 according to desired actions or a recipe. The commands related to dispensing the ingredients can include information such as when to add an ingredient and the amount of the ingredient to be added.

The ingredient dispenser 122 can be provided to the user with the ingredients in the compartments 40 (i.e., pre-filled compartments) or with the compartments 40 in an empty condition whereby the user must supply the ingredients to the compartments 40. When the compartments 40 are pre-filled, the type and amount of ingredients can correspond to a predetermined recipe. In one embodiment, the ingredient dispenser 122 can include replaceable compartments so that the user can insert compartments 40 that correspond to a desired recipe.

Employing the ingredient dispenser 122 provides several advantages. For example, the ingredient dispenser can accurately measure and dispense the ingredients at the proper time during the preparation of the material in the cooking vessel 44, thereby improving the quality of the resulting food. Additionally, the ingredient dispenser 122 eliminates or reduces the need for the user to be present at the first appliance 12 for dispensing the ingredients.

Figure 8:
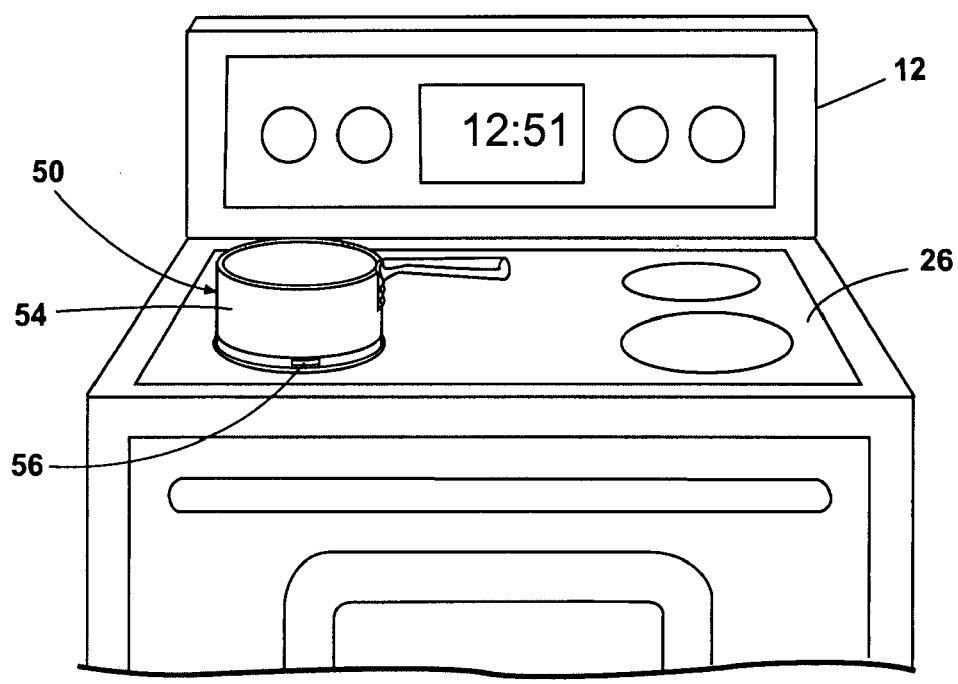
FIG. 8 is a schematic view of a cooking aid accessory in the form of a sensing cooking vessel according to one embodiment of the invention for use with a communicating appliance.

Exemplary sensing cooking aids include a sensing cooking vessel 50 and a removable cooking vessel sensor 52, which can both be associated with the first appliance 12 in the form of the oven. As shown in FIG. 8, the sensing cooking vessel 50 comprises a cooking vessel 54 and a sensor 56 that can detect a condition of the cooking vessel 54. The cooking vessel 54 can be any suitable type of cooking vessel, such as a pot or a pan. The sensor 56 can be, for example, a temperature sensor, a timer, a combination temperature sensor/timer, a sound sensor, a humidity sensor, a vision sensor, and a motion detector. The sensor can be integrated with the cooking vessel 54 or otherwise coupled with the cooking vessel 54. The sensor 56 can communicate with the first appliance 12, such as with the cooktop 26, or other component on the network to communicate the sensed condition of the cooking vessel 54. For example, the sensed condition can be boiling, boiling over, simmering, current temperature, boiling time, simmering time, time above a certain temperature, and temperature as a function of time (i.e., heating curve). The first appliance 12 can be configured to respond to the sensed condition of the cooking vessel 54, such as by increasing heat, decreasing heat, and increasing or decreasing time at a certain temperature. The response by the first appliance 12 can be in accordance with a recipe or with instructions programmed by the user. The sensing cooking vessel 50 thereby provides a means for closed loop temperature control between the cooking vessel 54 and the first appliance 12.

In the case of a vision sensor, the sensor could transmit video to anther device for the consumer. The consumer could then make control function decisions including control adjustments or stirring activation, as the case may be.

Figure 9:
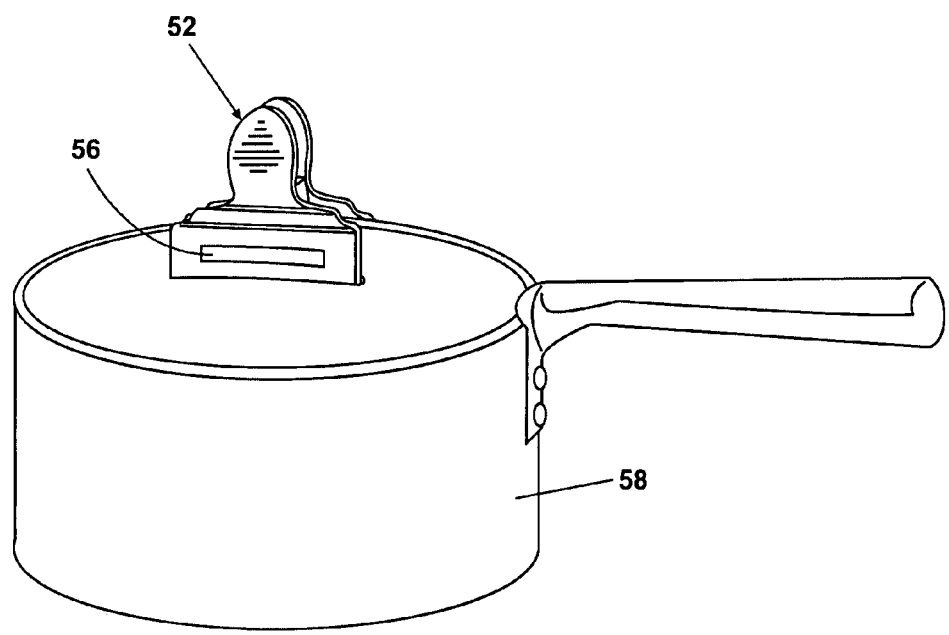
FIG. 9 is a schematic view of a cooking aid accessory in the form of a removable cooking vessel sensor according to one embodiment of the invention for use with a communicating appliance.

The functionality of the sensing cooking vessel 50 can alternatively be accomplished with the removable cooking vessel sensor 52. Referring now to FIG. 9, the removable cooking vessel sensor 52 is an accessory that can be removably coupled to a conventional cooking vessel 58 and comprises the sensor 56 described above with respect to the sensing cooking vessel 50. The removable cooking vessel sensor 52 can have any suitable form, such as a clip, as shown in FIG. 9 that removably clips onto the cooking vessel 58. Employing the removable cooking vessel sensor 52 eliminates the need for the user to purchase a special cooking vessel having the sensor 56; rather, the removable cooking vessel sensor 52 can be used with any cooking vessel as it can effectively add the sensor 56 to any cooking vessel.

The exemplary cooking aids described above, the controlled stirrer 20, the ingredient dispenser 122, the sensing cooking vessel 50, and the removable cooking vessel sensor 52, can be employed individually or in combination with one another. Each of the cooking aids 20, 22, 50, 52 provides a degree of automation to the cooking process, and using more than one of the cooking aids increases the degree of automation. When the user employs more than one of the cooking aids 20, 22, 50, 52, the cooking aids 20, 22, 50, 52 can optionally communicate with each other in addition to communicating with the first appliance 12 or other component on the network.

Figure 10:
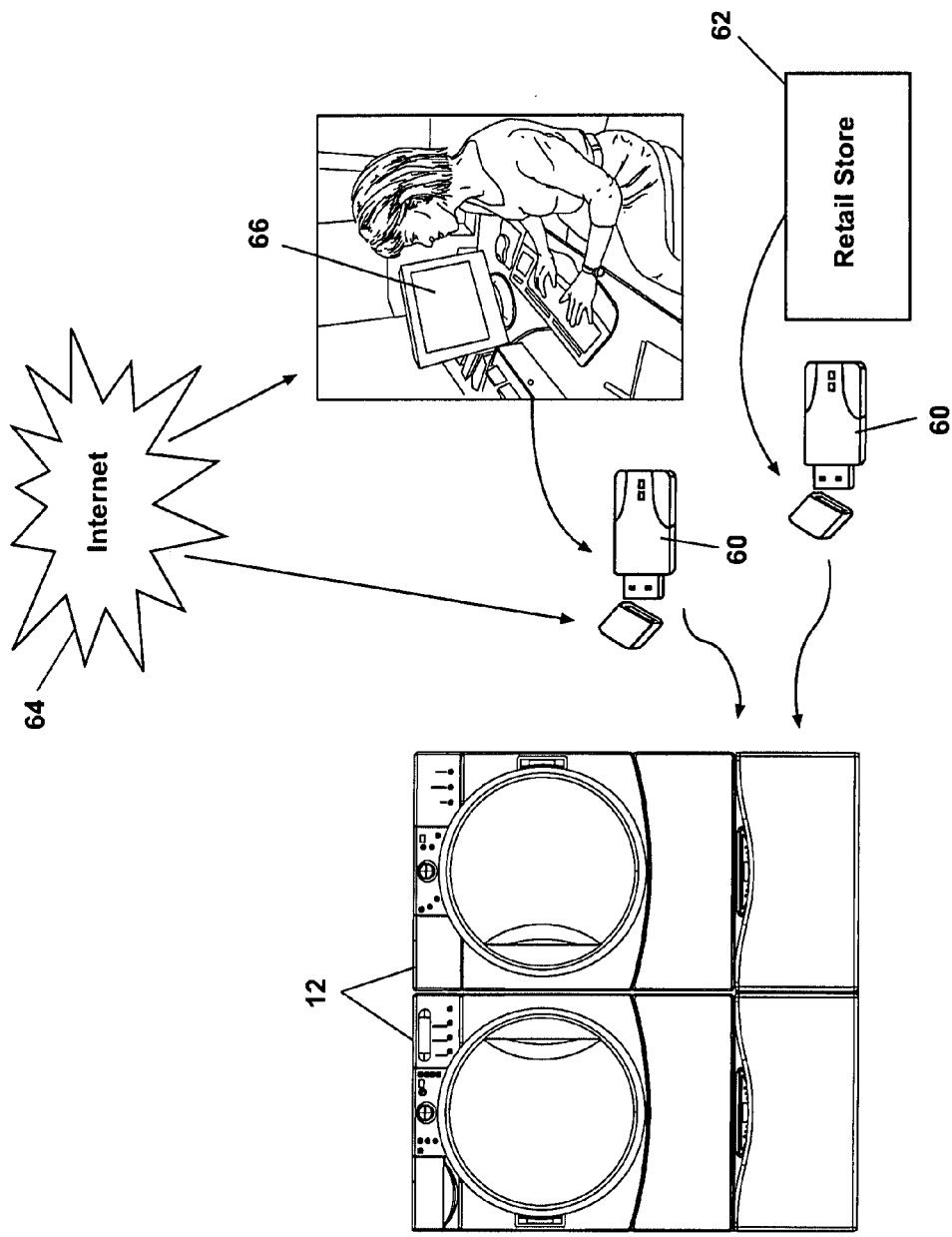
FIG. 10 is a schematic view of an operation cycle component according to one embodiment of the invention for use with a communicating appliance.

Another example of an accessory is an operation cycle component configured to store and transfer operation cycles for the appliance. An operation cycle is a set of commands that the appliance executes for operation of the appliance. For example, a washing machine can have several wash cycles that depend on the type of fabric being washed or a size of a fabric load. Similarly, an oven can have several cooking cycles that depend on the type of food being cooked and the cooking process (e.g., defrosting, baking, self-cleaning). Typically, the appliance when purchased by the user has a set of operation cycles that can permanently reside in the appliance as firmware. Referring now to FIG. 10, the operation cycle component 60 can store additional operation cycles not originally provided with the appliance 12 and communicate with the appliance 12 such that the appliance can implement the additional operational cycles. The operation cycle stored by the operation cycle component 60 can also or alternatively include an updated operation cycle. The operation cycle component 60 can be any type of component, such as a hardware device that can plug into the appliance 12. In FIG. 10, the operation cycle component 60 is shown as a USB dongle that can couple with both a personal computer and the appliance 12. The USB connection and communication is just for illustration and is not limiting on the invention. Any other suitable connector and/or communication method can be used.

With continued reference to FIG. 10, the additional operation cycles can be uploaded to the operation cycle component 60 in any suitable manner. For example, the operation cycle component 60 having the additional operation cycles can be purchased at a retail store 62, or the additional operation cycles can be uploaded to the operation cycle component 60 at the retail store. Alternatively, the user can download the additional operation cycles via the Internet 64. For example, the user can download the additional operation cycles through a personal computer 66 and then upload the additional operation cycles to the operation cycle component 60, or the user can wirelessly directly download the operation cycles to the operation cycle component 60. In another embodiment, the user can develop custom additional operation cycles on the personal computer 66 and upload the custom additional operation cycles to the operation cycle component 60. In an alternative embodiment, the additional operational cycles can be transmitted wirelessly from the personal computer 66 to the appliance 12 without using the operation cycle component 60. The wirelessly transmitted additional operational cycles can be transmitted to an intermediate storage in the appliance 12. The cycles can also be authenticated by the software architecture or other methods to ensure that they are compatible with and appropriate for the appliance.

Figure 11:
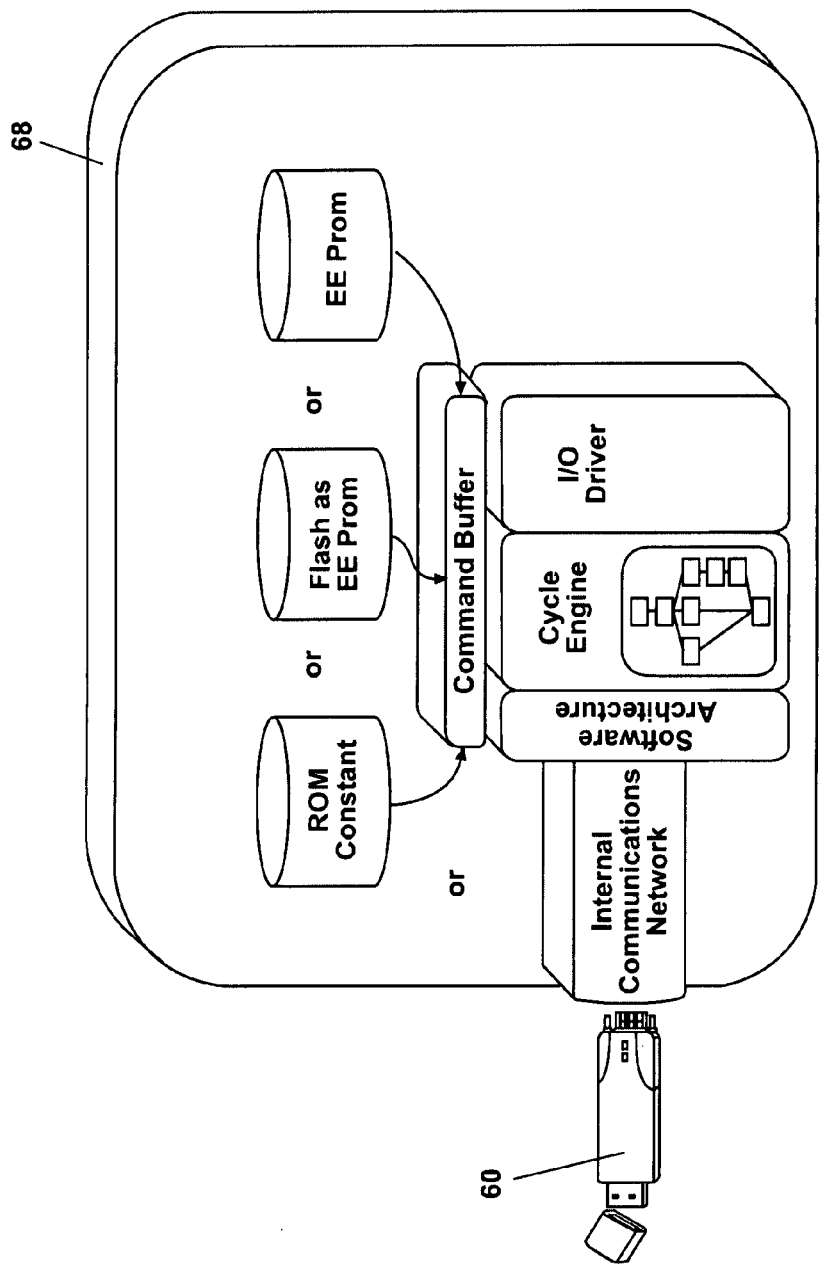
FIG. 11 is a schematic view of the operation cycle component of FIG. 10 coupled with a main controller of a communicating appliance.

The operation cycle component 60 can couple with the appliance 12 in any suitable manner, such as through a direct hardwire connection or a wireless connection. Furthermore, the appliance 12 can implement the additional operation cycles directly from the operation cycle component 60, or the additional operation cycles can be transferred from the operation cycle component 60 to the appliance 12. Referring now to FIG. 11, which illustrates a main controller 68 of the appliance 12, the additional operation cycles can be considered software that can be provided to the cycle engine. The cycle engine can operate on operation cycle data provided from multiple sources of persistence.

Other examples of an accessory include a consumable and a consumable reader. A consumable is an object external to the appliance that can be consumed or otherwise used during operation of the appliance or following operation of the appliance. The consumable can be consumed by the appliance or by the user. Examples of consumables include, but are not limited to, detergents and other wash aids for a laundry appliance and/or dishwasher, fabric items (e.g., clothing), heat and serve meals, frozen side dishes, frozen meals, microwave popcorn, frozen pizza, and frozen breakfast sandwiches. Characteristics or information, such as an operating cycle, usage directions, cooking instructions, dosage information, and washing/drying instructions, associated with the consumable can persist, for example, within the consumable itself, in the packaging for the consumable, or in auxiliary materials, such as user manuals and tags, provided with the consumable.

The consumable reader is a component that can accept the information associated with the consumable and transmit it to the controller of the appliance. The consumable reader can be a device integrated with the appliance or a separate device that can be coupled, either by a hardwire connection or wireless connection, to the appliance for communication with the appliance. Examples of consumable readers include, but are not limited to, bar code scanners, radio frequency identification (RFID) tag readers, and magnetic strip readers.

Figure 12:
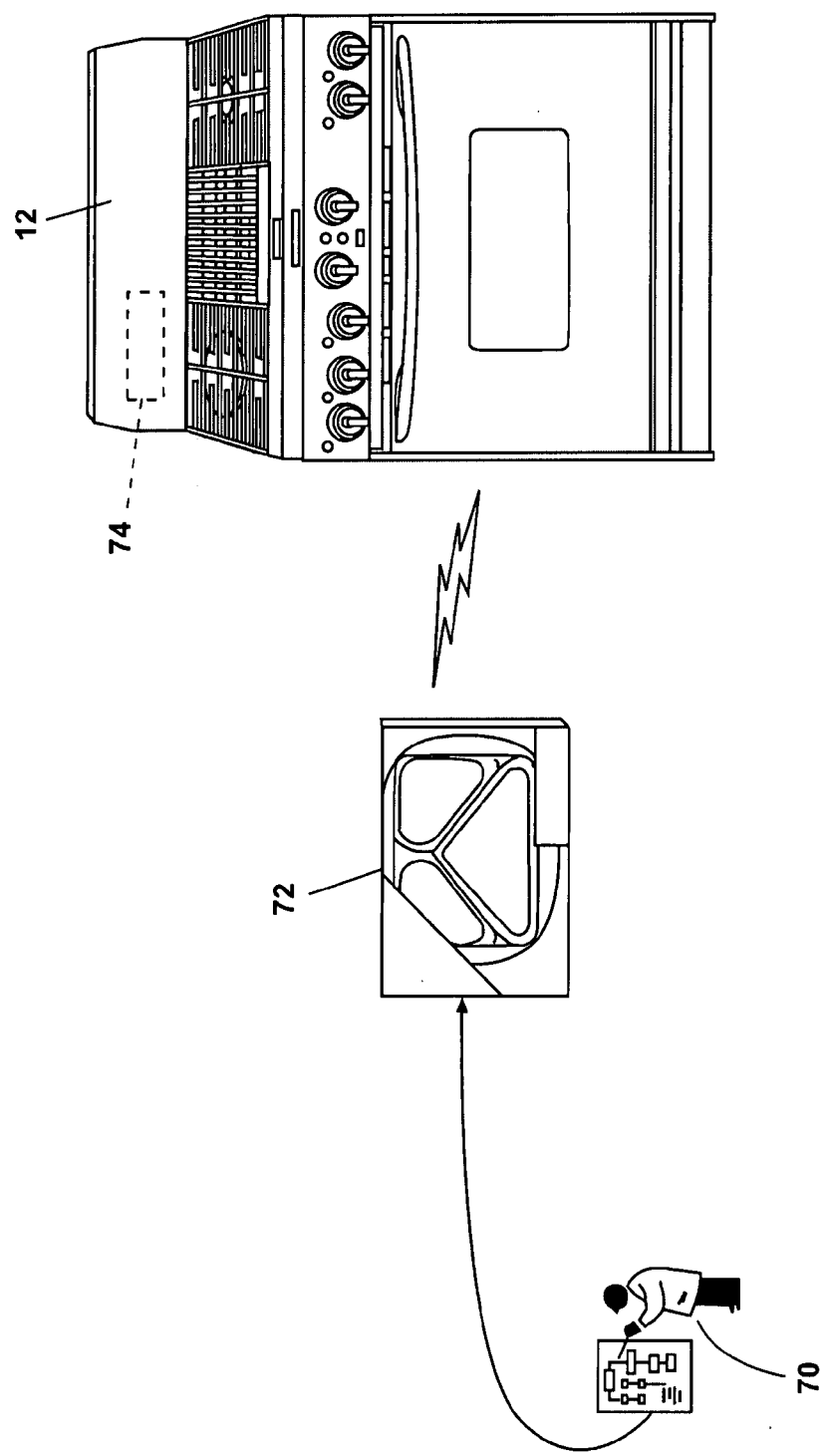
FIG. 12 is a schematic view of a consumable and a consumable reader according to one embodiment of the invention for use with a communicating appliance.

The consumable reader communicates the information associated with the consumable to the appliance so that the appliance can optimize its performance for the consumable. An example of employing the consumable and consumable reader is provided in the schematic illustration of FIG. 12. In this example, a food provider 70 determines cooking instructions for a consumable 72 in the form of a frozen meal and encodes the packaging for the consumable 72 with the cooking instructions. The user can place the consumable 72 in the vicinity of the appliance 12 in the form of an oven, and a consumable reader 74 of the appliance 12 communicates the encoded cooking instructions from the consumable 72 to the appliance 12. The appliance 12 can then execute the cooking instructions for preparing the frozen meal.

It is contemplated that the consumable will contain information corresponding to a preferred operating cycle for the consumable. In the case of a food item, the information would correspond to a cooking cycle for the consumable. The consumable can also have the ability to identify the appliance and provide an appliance-specific operating cycle. One manner of implementing this is for the consumable to have operating cycles corresponding to a particular appliance or class of appliance. The appliance in which the consumable is used identifies and implements the relevant operating cycle. Another manner of implementation is for the consumable to have an identifier and the appliance has stored or access to a database or table of operating cycles for different consumables. The appliance takes the consumable identifier and looks up the corresponding operating cycle for the consumable.

The information associated with the consumable can be in any suitable form. In one embodiment, the information can be a communication packet that can be directly transmitted to the software architecture, thereby eliminating a need for a central storage of consumables data. In another embodiment, the information can be a key that can be used to direct the appliance to stored consumables data.

It is within the scope of the invention to utilize the consumables without the consumable reader. For example, the consumable can be configured to directly communicate with the appliance or other component on the network without employing an intermediate consumable reader.

The consumables can be supplied by a third-party provider, as in the case of store-bought frozen meals and wash aids for laundry appliances and/or dishwashers, or provided by the user. Leftovers and cooked and uncooked prepared foods are examples of consumables that can be provided by the user. The leftovers and the prepared foods can be placed in a storage container encoded with information related to the leftovers and prepared foods. For example, the information can include re-heat or cooking instructions and an expiration date (i.e., throw away date). When the information includes the expiration date, the appliance, such as the oven or microwave oven, can refuse to re-heat or cook the food if the current date is past the expiration date. Optionally, the appliance can be configured to receive an override command from the user when the user desires to re-heat or cook the food despite the expiration date.

Any suitable material can be used to encode the information, and examples include, but are not limited to, plastic wrap, aluminum foil, pots, pans, microwave-safe containers, container lids, and an adhesive or magnetic strip that can be placed on the storage container. The information can be configured by the person who originally prepared the leftovers and the prepared foods and encoded using any suitable means, such as a personal computer, a magnetic strip writer, and a handheld encoding device. With this configuration, the user can configure the information on the consumable as desired.

Along the lines of the consumables and the consumable readers, another example of an accessory is a recipe book and a recipe book scanning wand. The recipe book can contain various recipes having associated cooking instructions, and the cooking instructions can be extracted by the recipe book scanning wand. For example, the cooking instructions can be extracted from text of the recipe book or hidden or visible encoding. The recipe book scanning wand can then communicate, via hardwire or wireless connection, the cooking instructions to the appliance for execution. In an alternative embodiment, the recipe book can directly communicate with the appliance without employing the recipe book scanning wand.

Another example of an accessory is a commercial laundry credit accessory. The commercial laundry credit accessory can be any suitable device, such as a card with memory and/or a microprocessor (commonly known as a "smart card") and a dongle. The commercial laundry credit accessory can store laundry operation cycle credits and communicate with the appliance in the form of a commercial laundry appliance, such as at a public laundry facility, via a direct or wireless connection. When the commercial laundry credit accessory has sufficient credits, the appliance will operate and deduct credits from the commercial laundry credit accessory based on the operation of the appliance. Optionally, individual users can purchase the laundry operation cycle credits, or others can purchase the laundry operation cycle credits for gifting purposes. In one embodiment, the laundry operation cycle credits can be purchased at the public laundry facility or remotely, such as via the Internet.

The credit accessory can also be used in combination with the software architecture to track usage and transferring the usage information to a local or remote central system. Price changes and other operating parameters for the laundry can be changed by the credit accessory. The price change can be linked to other information accessible through the software architecture, such as energy costs, for example. The credit accessory can also collect diagnostic information and call for service or alert the owner if there are any pending issues via wired or wireless. The smart card can also be used to supply alternate content to the user interface of the appliance, such as advertisement, for example.

Another example of an accessory is a customized connector that can be used to couple the appliance with another accessory or with another component on the network. The customized connector can be associated with any item, such as a cable or a dongle, that can couple with the appliance, and can be configured to prevent unauthorized, third-party devices, including generic brand replacement parts, from undesirably coupling with the appliance and other components on the network. Thus, the connecting item must have the customized connector to couple with the appliance or other component on the network.

Another group of exemplary accessories relate to energy usage. For example, the accessory can be an energy controller and/or energy monitor, hereinafter referred to collectively as the energy controller. The energy controller can be a separate component on the network that communicates with several appliances and other networked components in the home and also with an energy source, such as an electricity source. The energy controller can monitor the amount of energy used by each of the appliances and can distribute energy among the appliances. The distribution of energy can result in an efficient usage of energy and can also manage energy usage, for example, when the energy source curtails the amount of supplied energy. The energy controller can also control the operation of the appliances so that the operation occurs during non-peak energy usage times, which typically correspond to lower energy costs.

Figure 13:
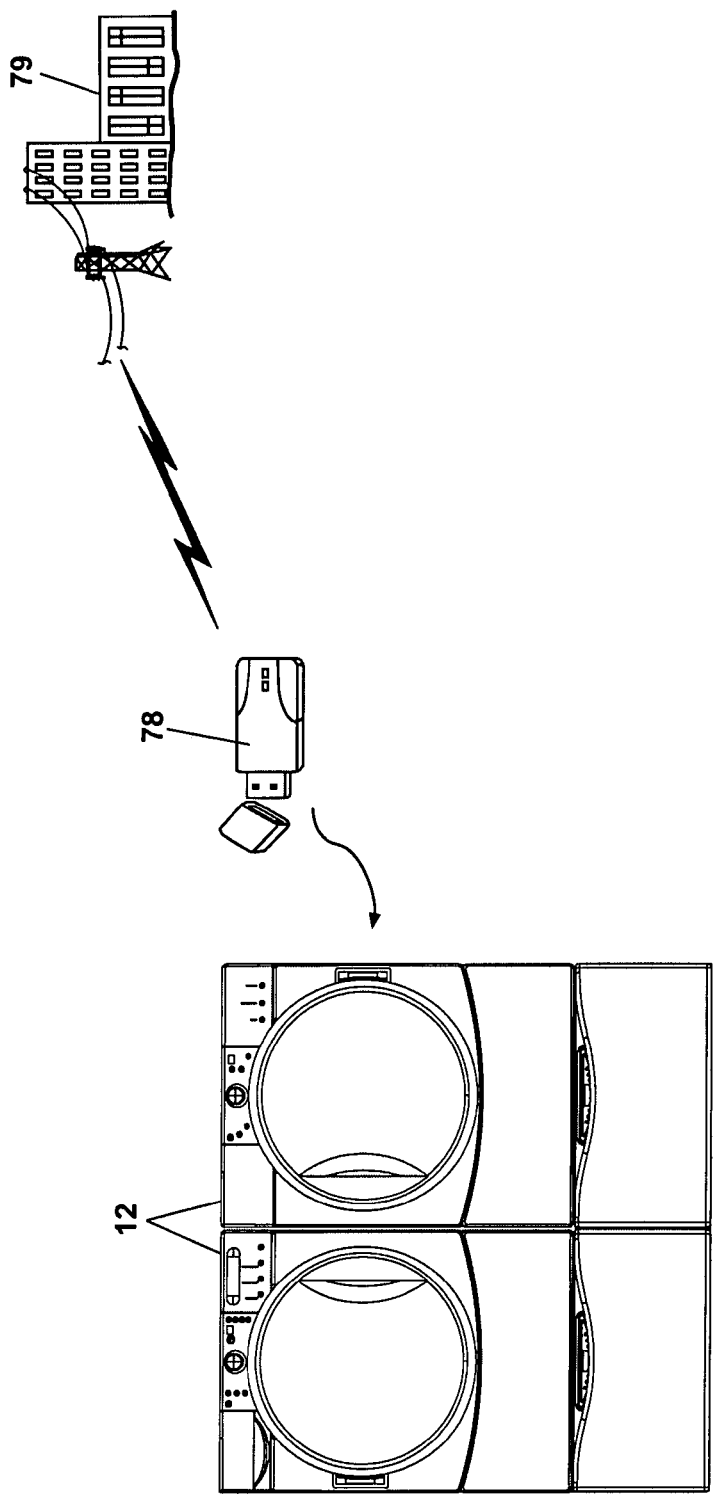
FIG. 13 is a schematic view of a connection assembly according to one embodiment of the invention for use with a communicating appliance and an energy controller.

The energy controller can be internally configured for communication with the appliances, or a separate connection accessory, such as a dongle, can be coupled to the energy controller to provide connectivity to the appliances. Similarly, the appliance can be internally configured for communication with the energy controller, or a separate connection accessory 78, such as a dongle, as illustrated in FIG. 13, can be coupled to the appliance 12 to provide connectivity to the energy controller. The connection accessory can have the ability to discover the type of appliance and provide appropriate modules of the software architecture for the appliance. In addition, the connection accessory can have the ability to respond to messages and commands from the energy controller. The connection accessories can be configured to provide wireless communication between the energy controller and the appliances.

The energy controller 78 can be connected to an energy supplier by any suitable means, such as, wireless, Internet, power lines, etc. With such a connection, the energy supplier can provide information relevant to the control of the appliance. The energy supplier can also remotely control the appliance in addition to or in lieu of providing information.

Other energy related accessories include a smart breaker, a smart dimmer, and a smart adapter. The smart breaker is described in detail in U.S. Pat. No. 6,988,375, issued Jun. 24, 2006 which is incorporated herein by reference in its entirety.

The smart dimmer is effectively a replacement for a load switch, such as a light switch, having discrete on/off control and can be used in any component on the network, including lights and ceiling fans. The smart dimmer provides the ability to not only switch power on and off but also to vary voltage, such as via triac control or converter/inverter control. The smart dimmer communicates with the energy controller, such as to respond to requests from the energy controller and to notify the energy controller of energy consumption status. By giving the energy controller additional control over the component associated with the smart dimmer, the energy controller has more capability to achieve target energy consumption without disruption to the user. Furthermore, in the event of an emergency energy curtailment, the energy controller can communicate with the smart dimmer to dim or shut off the lights or other component associated with the smart dimmer. The smart dimmer can also have associated sensing capabilities to feedback to the energy controller measurements of watts and power-factor.

The smart adapter is functionally similar to the smart dimmer but serves as a replacement for a common wall outlet. By replacing the common wall outlet with the smart adapter, which can communicate with the energy controller in a manner similar to the communication between the smart dimmer and the energy controller, "dumb" components, such as water heaters, that typically function in off/on modes can be plugged into the smart adapter and converted for use on the network and for operation at varying voltages. As a result, the components with the smart adapters can participate in energy curtailment programs and can communicate energy usage information to the energy controller.

Figure 14:
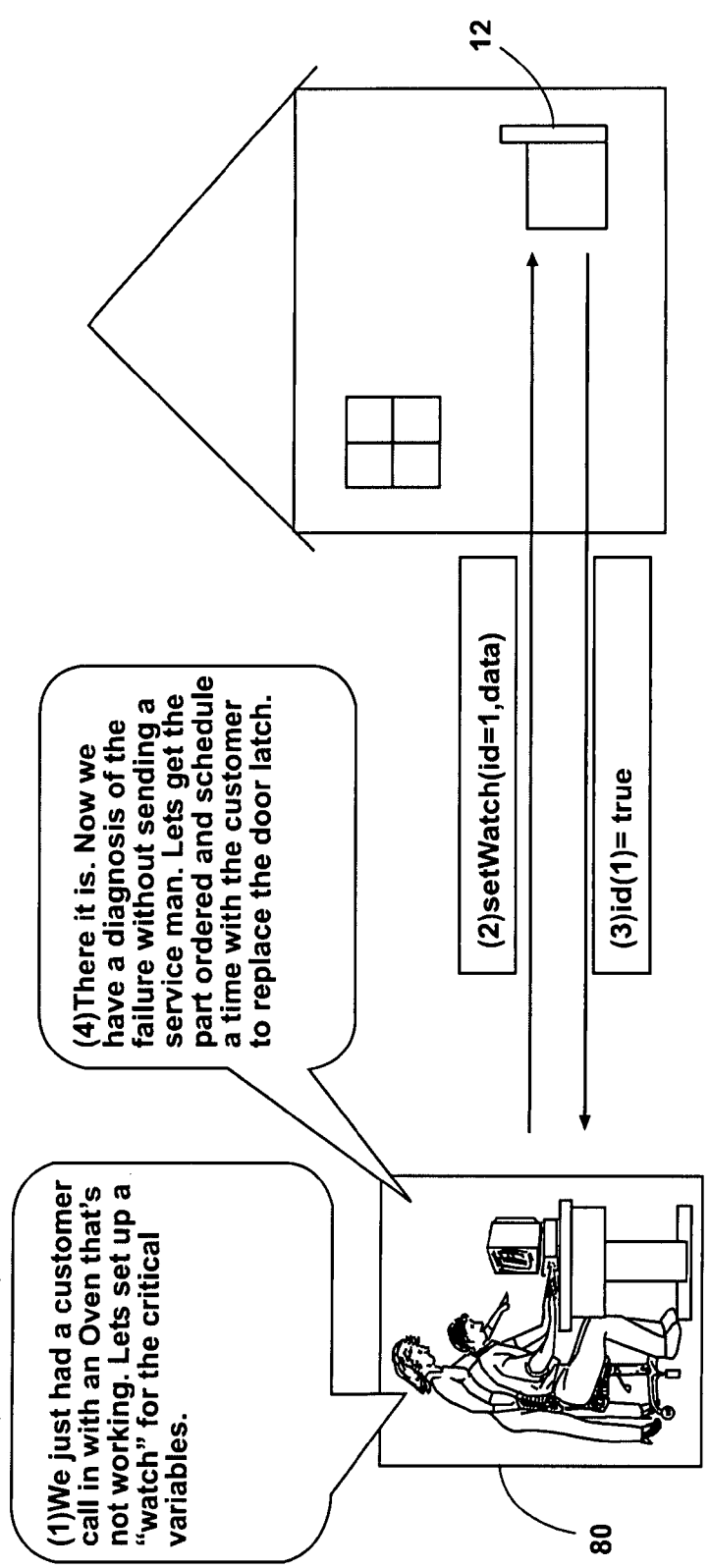
FIG. 14 is a schematic view illustrating remotely servicing a communicating appliance according to one embodiment of the invention.

Other examples of accessories relate to servicing the appliance. In one embodiment, a remote service center can communicate wirelessly with the appliance in the home. As a result, the remote service center can monitor the appliance, including low level components of the appliance, either passively or actively, and diagnose failures of the appliance. An example of passive monitoring of the appliance is illustrated in FIG. 14. In this scenario, the user communicates with the customer service center 80, such as via a telephone call or through the Internet, to inform the customer service center 80 that the appliance 12 in the form of an oven is not functioning properly. In response, the customer service center 80 communicates with the appliance 12 wirelessly to monitor the appliance 12 and diagnoses a failure associated with a component of the appliance 12, particularly the door latch. Thus, observation over the network enables the remote service center 80 to diagnose the failed component without a service visit to the home.

If information not available on the internal network of the appliance is needed for diagnosis, the remote service center 80 can use the DAQ, which is described in more detail in the aforementioned and incorporated PCT patent application to retrieve information available in memory of the associated appliance componentry for analysis of a problem or for searching for a problem.

If in addition to passive monitoring, the remote service center 80 determines the need to control and test the low level components of the appliance 12, the remote service center 80 can actively monitor the appliance 12. To actively monitor the appliance 12, the remote service center 80 can put the appliance 12 in a development state, which is described in more detail in the aforementioned and incorporated PCT patent application and priority application. In the development state, the remote service center 80 can communicate with the appliance 12 and actuate the individual components of the appliance, such as heaters, valves, and motors, to facilitate making a diagnosis. According to one embodiment, for the appliance 12 to enter the development state, the appliance 12 must be in an attended mode. In the attended mode, a responsible person must be present at the appliance to ensure that the actuation of the individual components of the appliance 12 does not harm anyone in the vicinity of the appliance 12. The responsible person can be the user of the appliance 12 or any other person deemed responsible. The presence of the responsible person can be confirmed in any suitable manner, such as by communication between an identification card of the responsible person and the appliance 12 or by the responsible person actuating a key press on the appliance 12.

As an alternative, the appliance can be monitored and diagnosed by an individual, such as the user, in the home with the aid of a service accessory rather than employing the remote service center. In this scenario, an automated service system replaces the remote service center. The service accessory can be any suitable device, such as a dongle, configured to communicate, either via a wired connection or wirelessly, with the appliance and with the automated service system.

Figure 15:
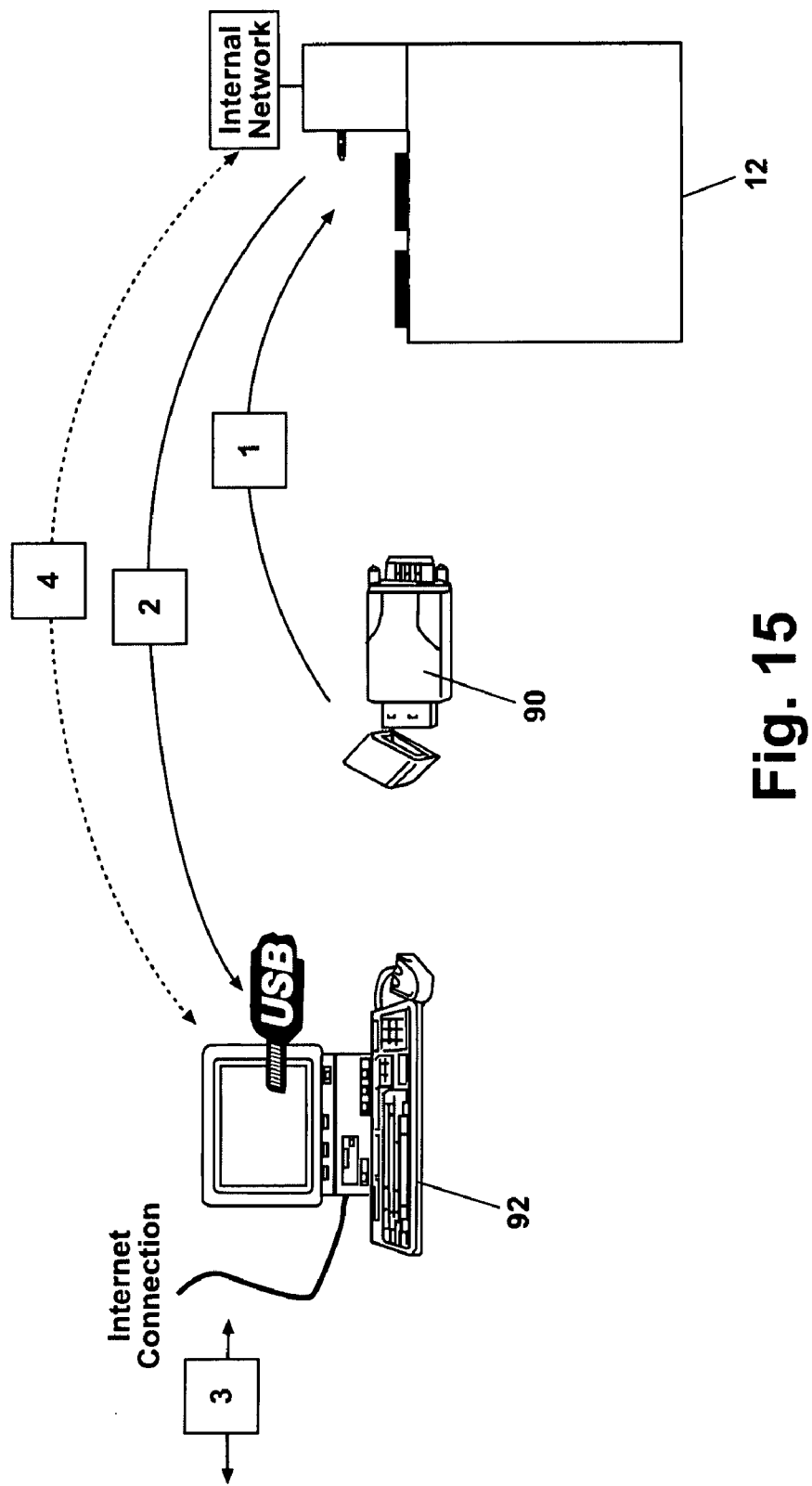
FIG. 15 is a schematic view illustrating self-servicing a communicating appliance according to one embodiment of the invention.

An example of self-servicing the application using the automated service system and the service accessory is illustrated in FIG. 15. Shown as step 1, the user couples the service accessory 90 to the appliance 12 in the form of an oven, and the service accessory 90 automatically configures to record diagnostic data from the appliance 12. If an appliance failure occurs, the user removes the service accessory 90 from the appliance 12 and couples the service accessory 90 to a personal computer 92, shown as step 2. Next, the service accessory 90 connects to the Internet via the personal computer 92, shown as step 3, and uploads the diagnostic data associated with the appliance failure to the automated service system. The automated service system analyzes the diagnostic data and determines an appropriate response. The response can include, for example, downloading customized testing scripts based on the diagnostic data, and the testing scripts can be used to further diagnose the appliance failure or eliminate the problem. The testing scripts can be downloaded via the Internet and the personal computer 92 to the service accessory 90, which can be re-coupled to the appliance 12, shown as step 4, for transferring the testing scripts to the appliance 12. Alternatively, the service accessory can be a coupling mechanism allowing a computing device, such as a cellular phone, a personal computer, and a personal digital assistant, to execute logic associated with data collection, analysis, and test scripts.

Other examples of accessories relate to home automation. Home automation systems are systems with a control center configured to control multiple objects, such as lights, drapes, blinds, thermostats, audio/video components, and security systems, within a home. Typical control centers are in the form of a monitor, such as a touchpanel monitor, or a remote control with a customized keypad. With the software architecture, the appliance can be integrated with the home automation system. In one embodiment, the appliance can be added to an existing home automation system whereby the appliance can be controlled, monitored, etc. from the control center. The appliance can optionally communicate with the control center via a wireless device coupled to the appliance. Alternatively, the appliance can be used as the control center. For example, a kitchen is generally a centralized location in the home, and one of the appliances, such as a refrigerator, in the kitchen can include the control center. In this example, the control center can be a monitor integrated into a door of the refrigerator.

By combining the appliance and the home automation system, several synergistic features become feasible. For example, when a fire alarm or smoke detector of the home automation system detects a fire or smoke, the combined appliance/home automation system can take appropriate actions, such as turning off an oven and cooktop, turning off HVAC systems, turning on lights, and shutting off gas supply. In another example, the user can set the combined appliance/home automation system in a vacation mode. Upon departure and during the vacation, the combined appliance/home automation system can take appropriate actions, such as shutting off water supply, turning off water heaters, increase refrigerator temperature, enable alarms, and setup an automatic telephone call to police if the refrigerator door opens. On return, the combined appliance/home automation system can take appropriate actions, such as turning on water supply, turning on water heaters, decrease refrigerator temperature, and disable alarms.

As another example, the combined appliance/home automation system can provide notifications to the user for time management benefits and peace of mind. Notifications for time management benefits can include, but are not limited, to fabric/dish washing complete, fabric/dish drying complete, microwave defrost complete, turn food for microwave defrost, oven pre-heat complete, and food cooking complete. Upon receiving the notification, the user can immediately attend to the corresponding appliance to remove the fabric load, dish load, food, etc. rather than spending the time to periodically having to check whether the operation cycle is complete and possibly delaying initiation of another operation cycle. Notifications for peace of mind can include, but are not limited to, refrigerator door ajar, freezer door ajar, water filter operational, oven left on, cooktop left on, basement humidity level satisfactory, air filtration system functioning, air quality index, boil over on cooktop, and grill flame exceeding limit.

The notifications can be provided to the user on the control system or a remote device that can be used outside the home. Examples of remote devices include, but are not limited to, a cellular phone, a key fob, and a pager/buzzer. The remote device can be configured with the software architecture for communication with the appliance or other component on the network.

Another example of an accessory is a network binder. The network binder is a device that binds nodes on a wireless network to the network by assigning an identical unique network ID to each node. Binding allows nodes that are within communication range of each other to be bound together to create private networks and separate the nodes from other nodes that are also within communication range but not part of the network. The network binder can be useful when there are multiple networks within range of one another, as in a neighborhood or an apartment building. The private network prevents communications from being inadvertently transmitted between networks, which would prevent unexpected interactions. The network binder of the present application can be a wireless device that is solely used for binding appliances or other components in a relatively short range of the network binder. For example, the network binder can have a limited transmission range of about three to four feet to ensure that the target appliance or other component becomes bound to the network when the network binder is operated. An exemplary network binder 100 is illustrated in FIG. 16 and comprises at least one button 102 that can be depressed when in the vicinity of the appliance 12 or other component to bind the appliance 12 or other component to the network. The network binder can optionally have the ability to communicate with a personal computer or other computing device so that the computing device can also be configured.

Figure 17:
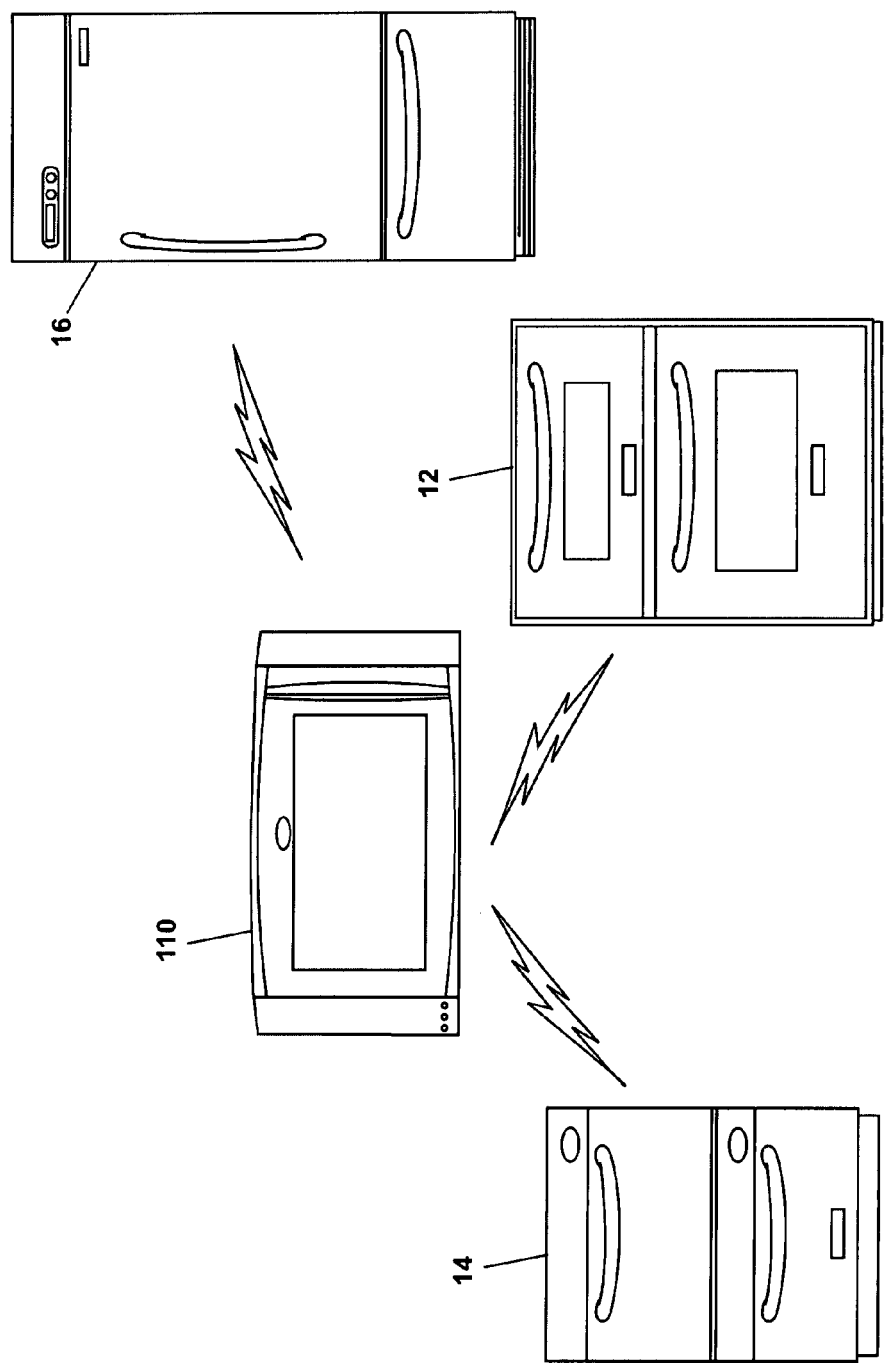
FIG. 17 is a schematic view of a remote user interface according to one embodiment of the invention for use with a communicating appliance.

Another example of an accessory is a remote user interface. The remote user interface is a user interface that can communicate with one or more appliances and can be positioned remotely from the appliances with which the remote user interface communicates. For example, the remote user interface can be positioned in a central location in the home or can be portable within the home. The remote user interface can provide many, if not all, of the functions associated with a traditional user interface of the appliance and can include additional functionalities. The remote user interface can have any suitable form, such as a monitor, including a touchpanel monitor 110, as illustrated in FIG. 17. Other examples of the remote user interface can include, but are not limited, to a remote keypad, a phone, a personal computer, a voice recognition device, a voice generation device, a sound generation and recognition device, a remote control, a user interface of a home automation system, a user interface of a component different from the components of the appliance, a television, a device that plays recorded music, a device that plays recorded video, and a personal digital assistant. According to one embodiment, the remote user interface can be employed in addition to the traditional user interfaces on the appliances associated with the remote user interface. Alternatively, the appliances associated with the remote user interface do not include a separate user interface that physically resides on the appliances. Furthermore, the remote user interface can be used in conjunction with the above-described combination appliance/home automation system.

Another example of an accessory is an appliance monitor. The appliance monitor, which can be a device integrated with or separate from the appliance, monitors and records operational data associated with the appliance. The appliance monitor can monitor one appliance or a plurality of appliances. Optionally, the appliance monitor can include a display for displaying an operational status of the appliance and can be integrated with the remote user interface described above to also provide the ability to issue commands to the appliance. Furthermore, the appliance monitor can optionally be configured to transmit the operational data associated with the appliance to another device, such as a personal computing device or an intermediate storage device, such as a dongle.

Figure 18:
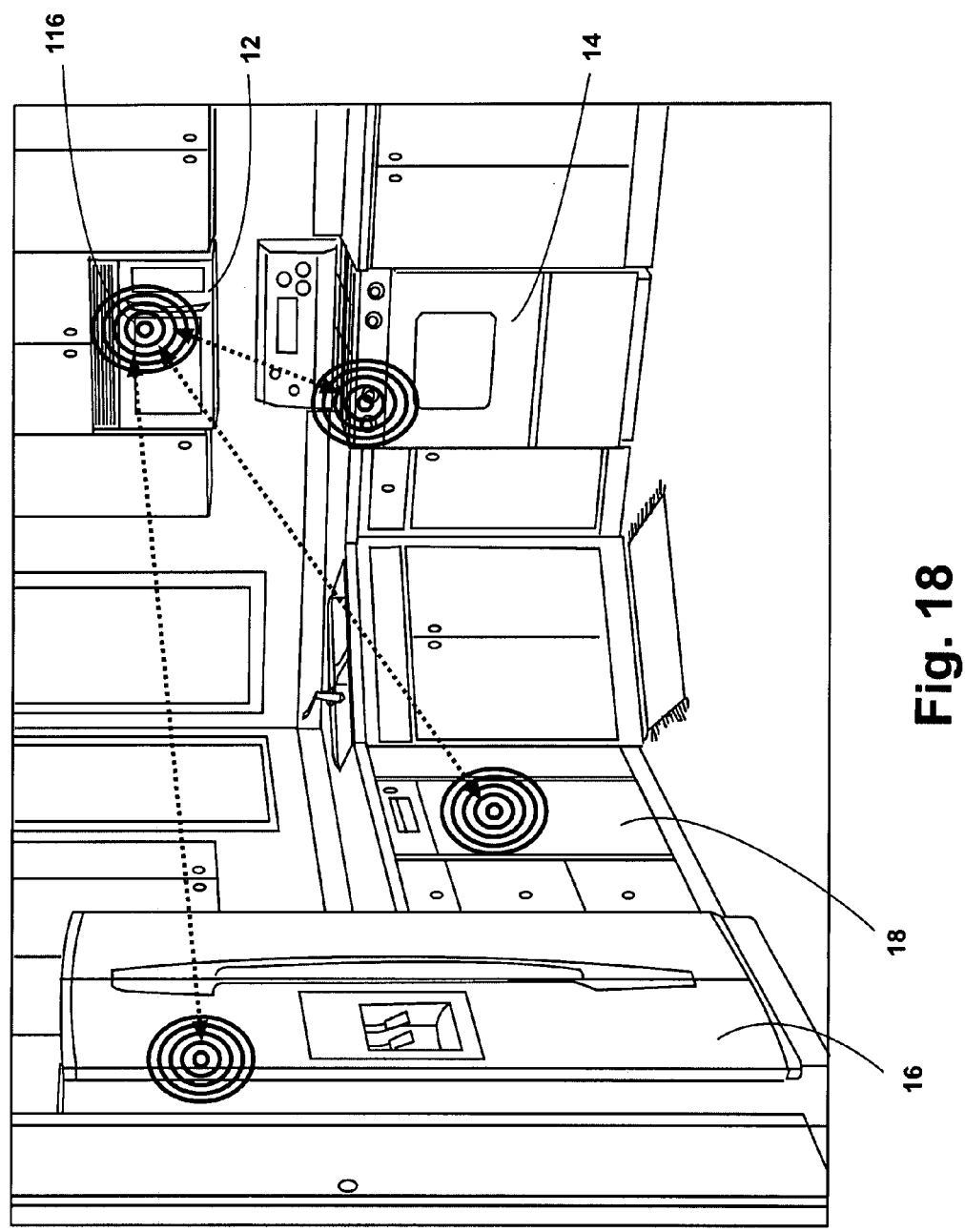
FIG. 18 is a schematic view of an appliance monitor integrated into a communicating appliance according to one embodiment of the invention.
Figure 19:
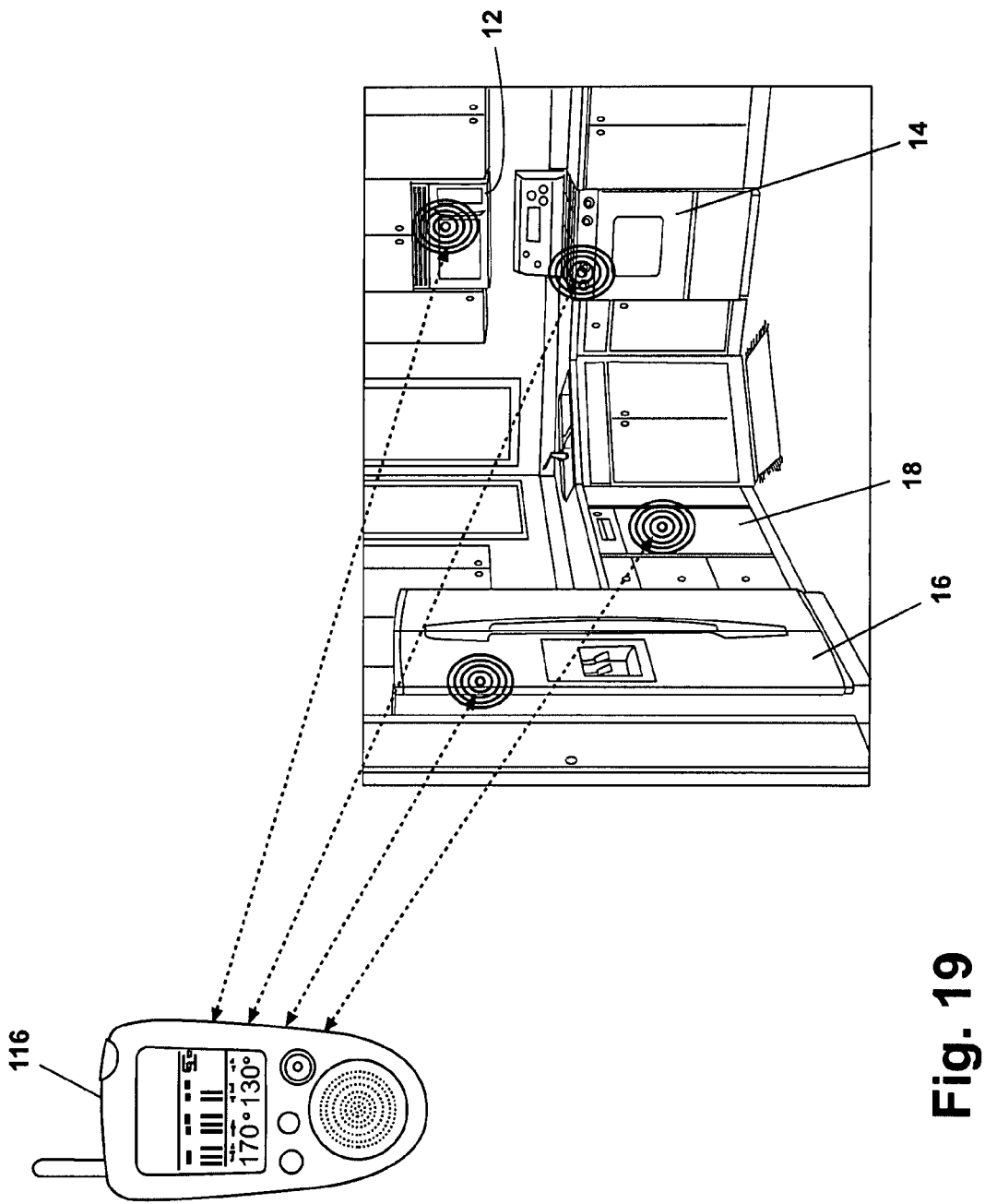
FIG. 19 is a schematic view of a remote appliance monitor according to one embodiment of the invention for use with a communicating appliance.

In an example illustrated in FIG. 18, the appliance monitor 116 is integrated into the first appliance 12 in the form of a microwave oven, and the second, third, and fourth appliances 14, 16, 18, along with the first appliance 12, communicate with the appliance monitor 116. In another example illustrated in FIG. 19, the appliance monitor 116 is a separate, portable device that communicates with the first, second, third, and fourth appliances 12, 14, 16, 18. The portable appliance monitor 116 can be carried by the user so that the user is able to observe the operational status of the appliance at any desired time.

Figure 20:
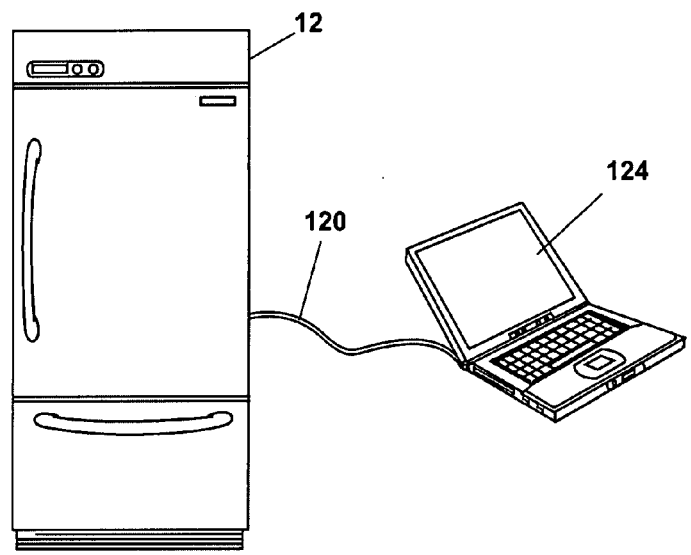
FIG. 20 is a schematic view of a smart cable according to one embodiment of the invention for use with a communicating appliance.
Figure 21:
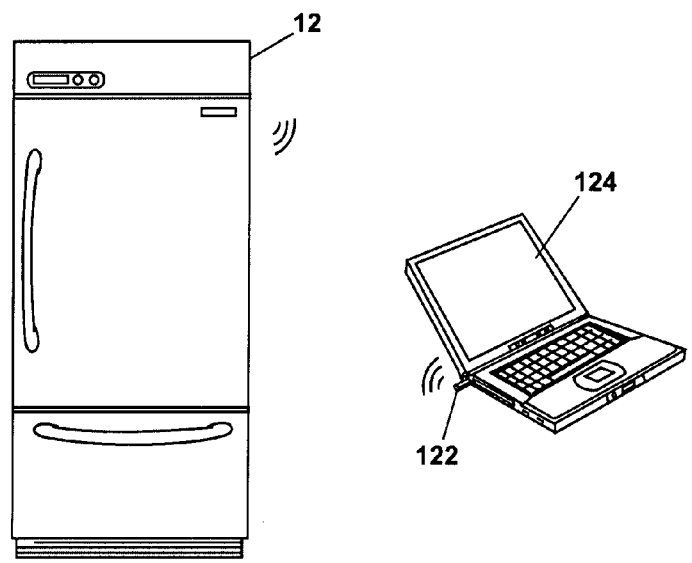
FIG. 21 is a schematic view of a smart wireless coupler according to one embodiment of the invention for use with a communicating appliance.

Other examples of accessories relate to servicing the appliances. If the appliance experiences a failure that requires a service person to visit the appliance in the home, the service person can couple a personal computer or other portable computing device to the appliance using a smart coupler, which can be a smart cable 120 or a smart wireless coupler 122. As shown schematically in FIG. 20, the smart cable 120 hardwires the appliance 12 with the portable computing device 124. The smart cable 120 can include special, proprietary electronics that enable communication between the appliance 12 and the personal computing device 124. As a result, unauthorized persons who do not have the smart cable 120 cannot couple an unauthorized computing device with the appliance. Referring now to FIG. 21, the smart wireless coupler 122 accomplishes the same goal as the smart cable 120, except that the former provides a wireless rather than hardwired connection between the appliance 12 and the portable computing device 124. The smart wireless coupler 122 can be any suitable device, such as a proprietary wireless dongle, that establishes a proprietary connection between the appliance 12 and the portable computing device 124.

Figure 22:
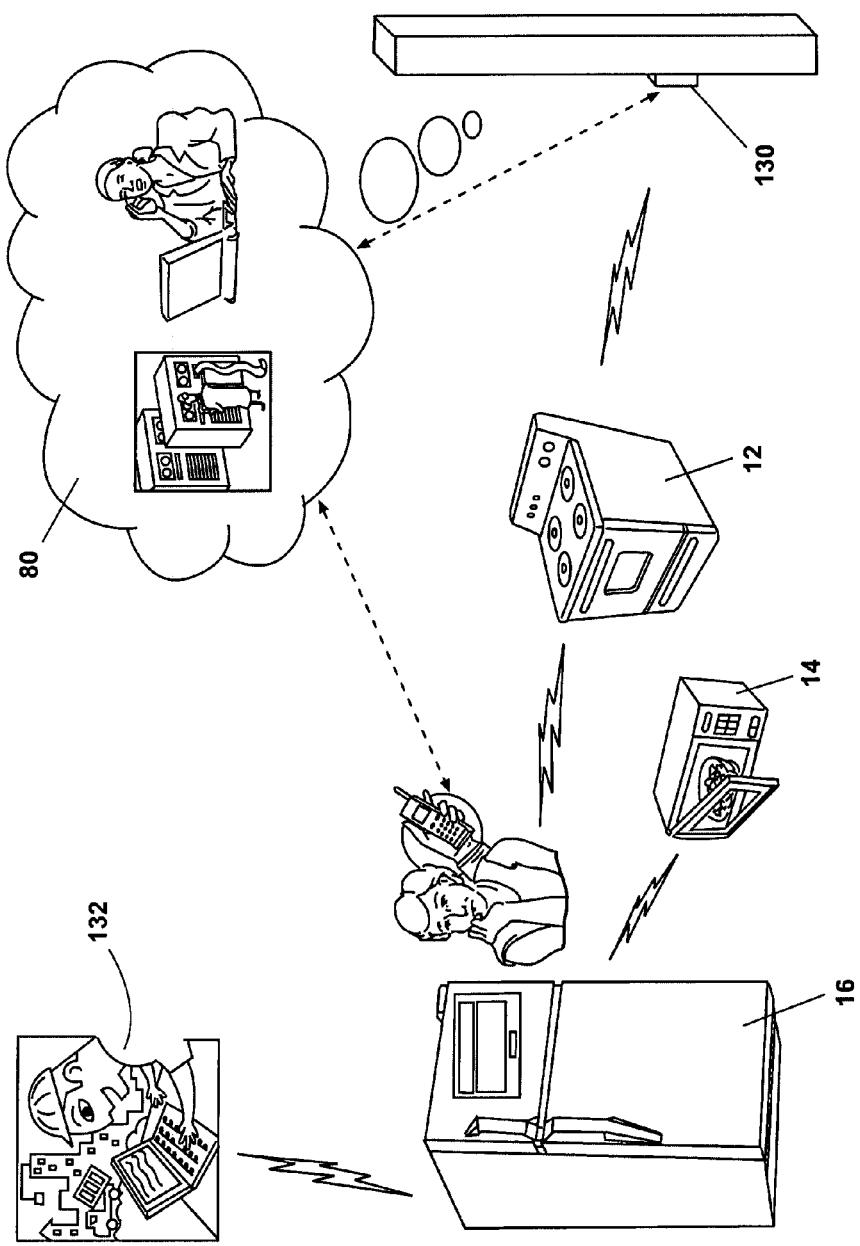
FIG. 22 is a schematic view of a central collector according to one embodiment of the invention for use with a communicating appliance.

Additional service-related accessories include a central collector 130 and a local collector 132, which can implement the same service-related functions previously described. Referring to FIG. 22, the central collector 130 functions similarly to the appliance monitor described above in that the central collector 130 communicates with the appliance(s) and monitors and records operational data associated with the appliance(s). The central collector 130 is illustrated in FIG. 22 as a box mounted to a wall in the home, but the central collector 130 can assume any suitable form and can be located in any suitable location, including on or in the appliance. The central collector 130 can communicate with the appliances 12, 14, 16, such as via a wireless connection, and the remote service center 80 can also communicate with the central collector 130. As a result, when an appliance failure occurs, the user can communicate with the remote service center 80, such as via telephone, to inform the remote service center 80 of the appliance failure, and the remote service center 80 can communicate with the central collector 130 to receive and analyze the operational data associated with the failed appliance. Furthermore, if the appliance failure requires a visit from a service person 132, the service person 132 can optionally communicate with the central collector 130, such as via a portable computing device, to receive and analyze the operational data associated with the failed appliance. The central collector 130 can also be employed by the service person 132 for field testing of the appliance. While illustrated external of the appliances, the central collector can be located within one of the appliances.

The central collector 130 can also be used for aggregation of customer usage data. The customer usage data can be sold to third parties and can be used in customer studies to gain insight to customer usage patterns and preferences. As another option, the central collector 130 can be used for benchmarking. The operational data associated with the appliance can be aggregated and compared to benchmarks or used to generate benchmarks related to appliance performance. When the operational data is compared to a benchmark, and the comparison indicates a degradation of appliance performance, the user can be alerted to the decrease in performance.

A derivative of the central collector 130 is a black box recorder. The black box recorder can function similarly to the central collector 130 but is constructed such that it cannot be destroyed or at least retains the operational data associated with the appliance in case of a fire or other event potentially destructive event to the appliance or the home. The operational data can possibly be used by insurance companies and investigators to assess the cause and effects of the destructive event.

Figure 23:
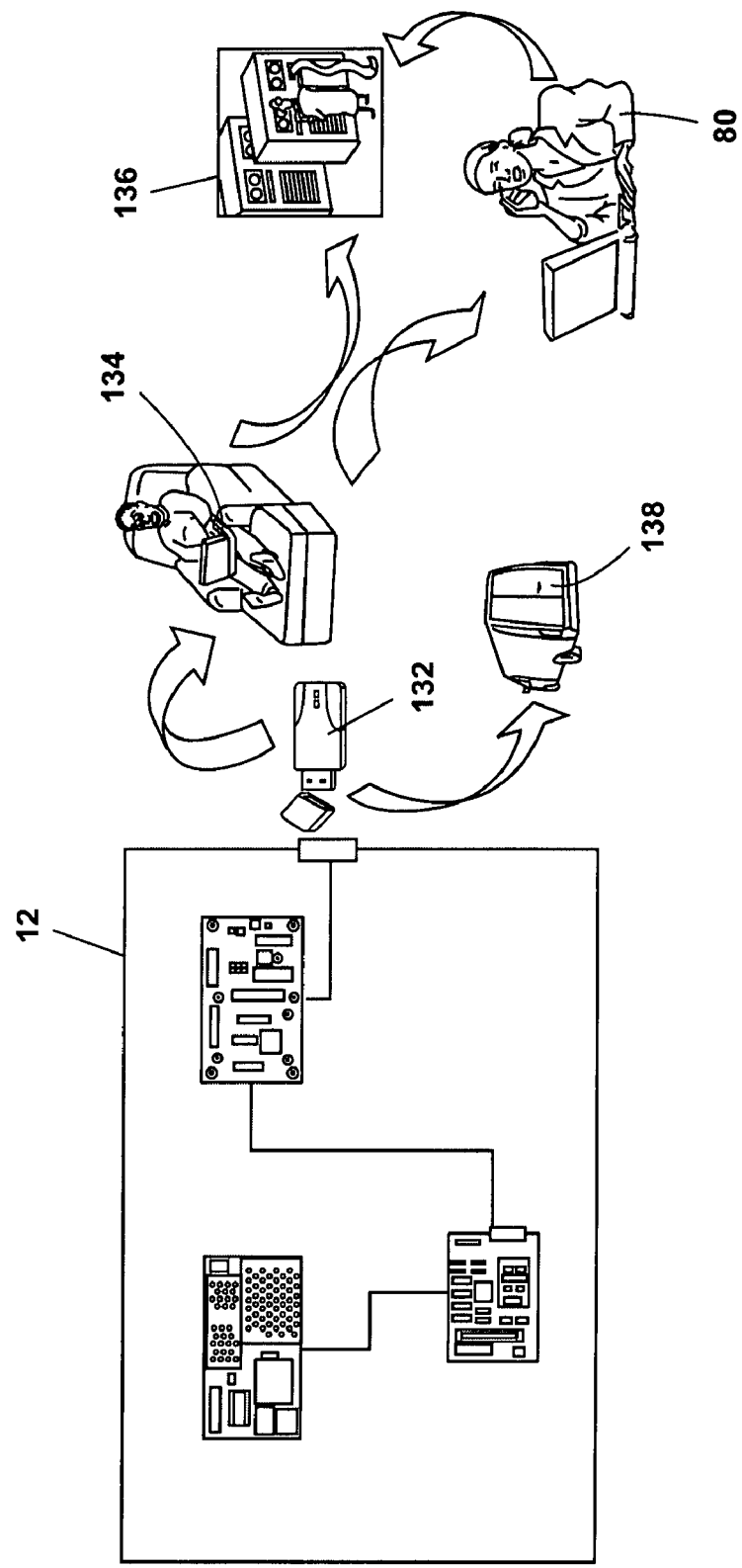
FIG. 23 is a schematic view of a local collector according to one embodiment of the invention for use with a communicating appliance.

Referring now to FIG. 23, the local collector 132 functions similarly to the central collector 130 in that the local collector 132 communicates with the appliance(s) and monitors and records operational data associated with the appliance(s); however, the local collector 132 is a portable device that can removably couple with the appliance(s). As shown in FIG. 23, where the local collector 132 is illustrated as a dongle, the local collector 132 can be coupled with the appliance 12 to receive the operational data associated with the appliance 12 and removed from the appliance 12. After removal from the appliance 12, the local collector 132 can be coupled with a computing device 134 of the user, and the operational data can be sent from the computing device 134, such as via the Internet, to a remote location, such as the remote service center 80 or a remote automation center 136. If the user does not have the computing device 134 or an Internet connection, then the local collector 132 can be provided to a shipping service 138 for delivery to the remote location.

The local collector 132 can be implemented using the service accessory 90. Either of the local collector 132 or the service accessory 90 can be interfaced with the electrical system of the appliance and with either the appliance or with a service tool (accessory) to perform enhanced diagnostics and performance analysis of the appliance. Exemplary uses would be to validate that each output device (when acutated) consumes the expected electrical consumption, and to realize certain performance or failure conditions by evaluating information contained in the electrical bus (example frequency analysis).

Another example of an accessory is an appliance coupler. The appliance coupler can be any device, such as a cable connector or a device capable of wireless communication, that enables direct communication between appliances. As a result, the coupled appliances can communicate with each other, which can be especially beneficial when the operation of one appliance affects the operation of another appliance. For example, a washing machine and a dryer can be coupled together by the appliance coupler, and the operational cycle of the dryer can be selected based on the operational cycle employed by the washer.

Figure 24:
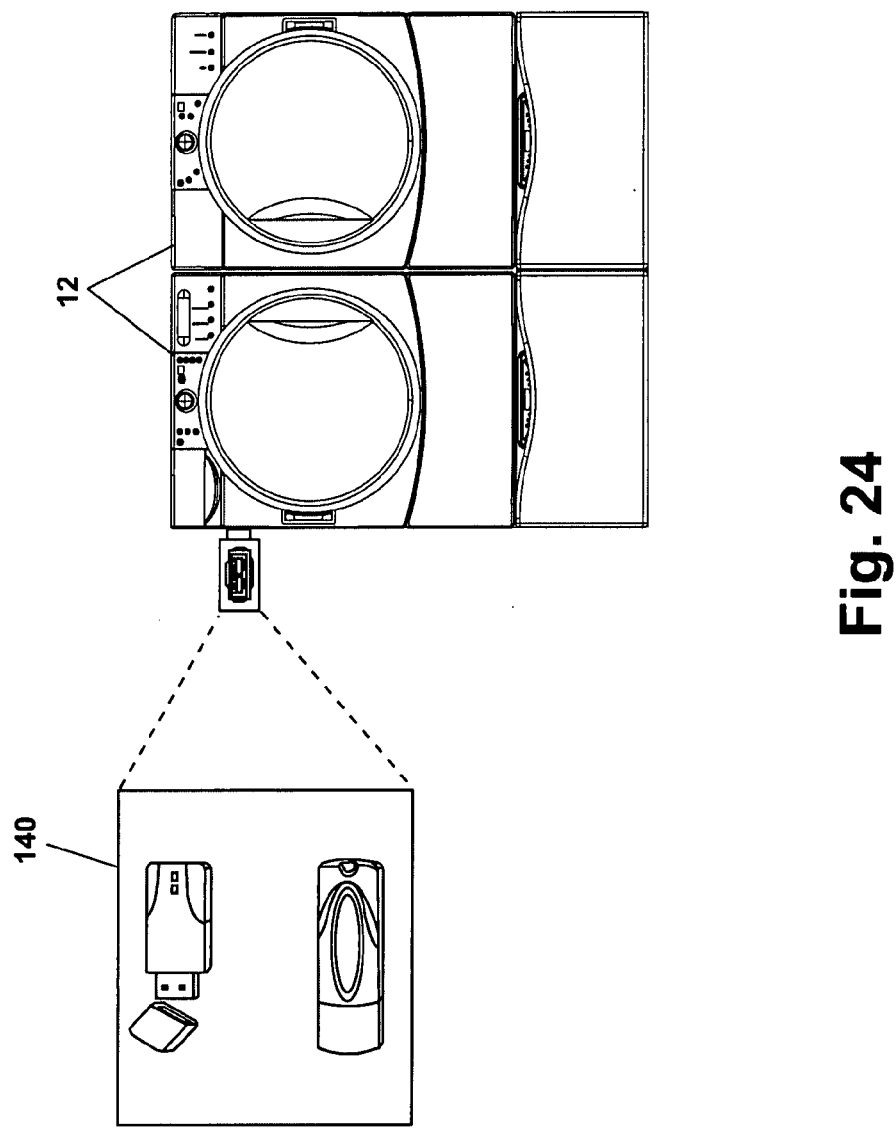
FIG. 24 is a schematic view of a sales demo accessory according to one embodiment of the invention for use with a communicating appliance.

Another example of an accessory is a sales demo accessory. As shown by example in FIG. 24, the sales demo accessory 140 can be a portable device, such as a dongle, that can removably couple with the appliance 12 on display at a retail store. The sales demo accessory 140 can store sales demos that can be executed by the appliance 12. The sales demos can control the appliance 12, highlight certain features of the appliance 12 for the customer, and can be interactive with the customer. Examples of the sales demos include, but are not limited to, displaying promotions on a user interface, user interface light and sound shows, voice feedback combined with user interface key presses, voice command and control, video playback combined with user interface key presses, motion sensing, and mechanical system custom demonstrations. When the software architecture enables control of individual components of the appliance 12, the sales demo can take advantage of this capability and combine the control of the components with external electronics and customization, thereby motivating the customer to interact with the appliance 12. The sales demo mode can be implemented by placing the appliance into a development state using the software architecture.

The sales demos can be downloaded to the sales demo accessory 140 from a web site associated with the manufacturer of the appliance 12 and updated periodically to reflect current marketing strategies of the manufacturer of the appliance 12. By differentiating the appliance 12 from other appliances on display in the retail store, the sales demos can help improve sales of the appliance 12. The sales demos can be customized according to the retail store and trade partners of the manufacturer of the appliance 12. Furthermore, by locating the sales demos on the sales demo accessory 140, code for sales demos that would traditionally reside on the appliance 12 can be removed from the appliance 12, thereby reducing development time and cost of the appliance 12.

Figure 25:
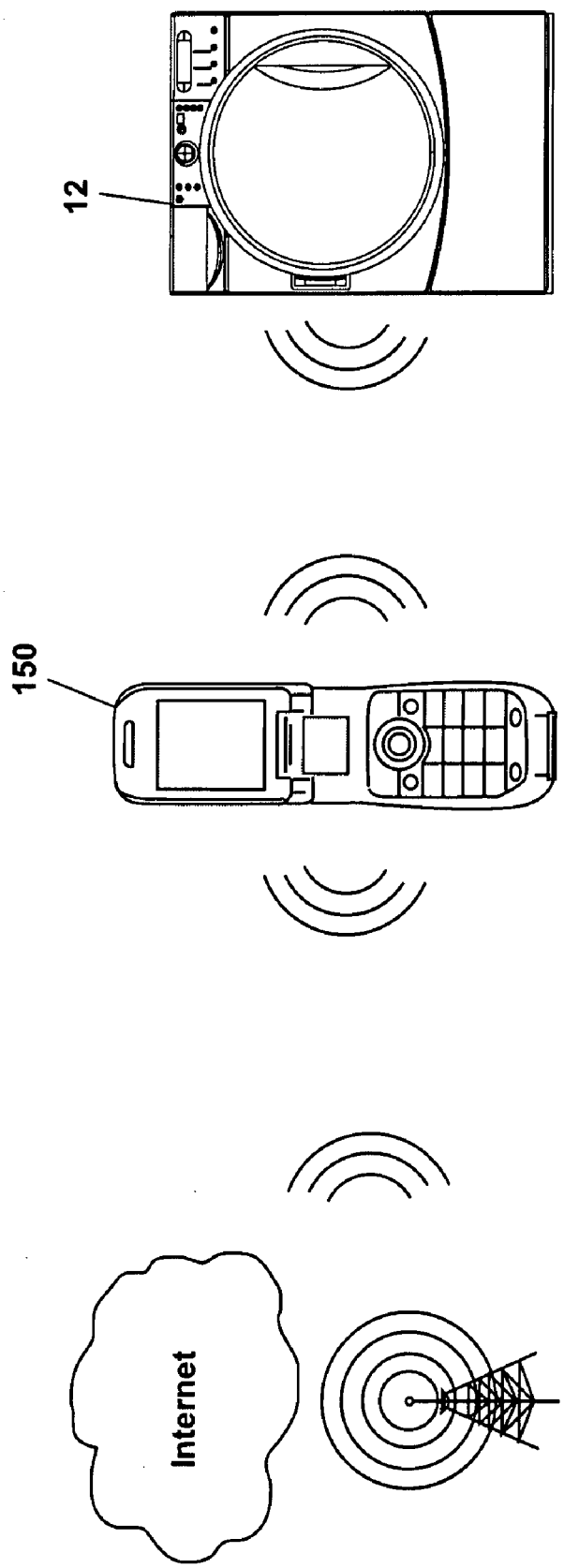
FIG. 25 is a schematic view of a cellular phone according to one embodiment of the invention for use with a communicating appliance.

Another example of an accessory is a cellular phone, which can be used for communication with the appliance 12. In general, today's cellular phones have several integrated technologies, including networking capabilities (Including Bluetooth), Internet connection capabilities, color user interfaces, premium sound, voice recognition capabilities for automatic dialing, and tactile feedback (e.g., vibration), and these integrated technologies can be utilized in conjunction with the appliance 12. Referring to FIG. 25, the cellular phone 150 can communicate with the appliance 12 via Bluetooth or an external connector, such as a USB connector. The cellular phone 150 can also communicate via the Internet. Thus, the cellular phone 150 can download information from the Internet and communicate the downloaded information to the appliance 12 and, conversely, receive information from the appliance 12 and upload the information to the Internet. The information can be any type of information related to the appliance 12, such as applications, custom tests, custom audio, diagnostic data, and customer data.

Examples of using the cellular phone include, but are not limited to, remote diagnostics and service, interactive audio, voice control, and enhanced user interface. For remote diagnostics and service, the cellular phone discovers the appliance and downloads diagnostic tests from the Internet. The cellular phone can locally execute the diagnostic tests through the software architecture and Bluetooth (or other communication means). After the diagnostic tests are complete, the cellular phone can upload testing results to the Internet for diagnosis. For interactive audio, the cellular phone discovers the appliance and downloads custom audio files from the Internet. The cellular phone can register with the appliance for key status events through the software architecture and Bluetooth (or other communication means). When the key events occur on the appliance, the cellular phone can automatically play the appropriate audio file to provide enhanced feedback. For voice control, the user can input voice commands into the cellular phone, and the cellular phone can convert the voice command to a command for the software architecture and transmit the command over Bluetooth (or other communication means). Finally, for the enhanced user interface, a user interface application, which can be downloaded from the Internet, can be executed on the cellular phone. The user interface application can take advantage of the color user interface, the premium sound, and the tactile feedback on the cellular phone. The control of the appliance 12 via the enhanced user interface and feedback from the appliance 12 to the enhanced user interface can occur locally through the software architecture and Bluetooth (or other communication means).

Another example of an accessory is an audio communication accessory. The audio communication accessory is a device that communicates with the appliance or other component on the network having a traditionally visual user interface and adds audio capabilities to the user interface. The audio communication accessory can also be used with any appliances or other component on the network that does not have a user interface. By incorporating the audio communication accessory, the appliance or other component on the network can audibly communicate information related to the appliance or other component to the user, and, optionally, the user can audibly communicate commands and the like to the appliance or other component through the audio communication accessory. Audible communication can be especially beneficial to users having a physical disability, such as blindness or mobility issues where it is difficult for the user to move within visual range of the appliance or other component. The audible communication can be voice (i.e., speaking) or a variety of sounds, such as beeping, alarms, Morse code, songs, etc.

Figure 26:
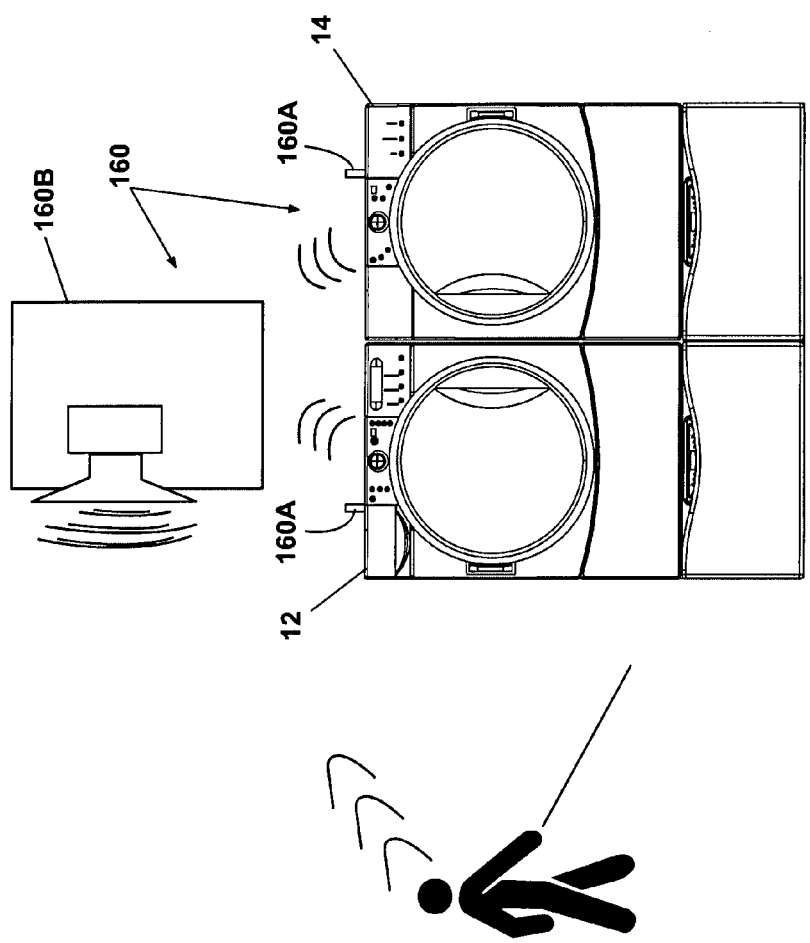
FIG. 26 is a schematic view of an audio communication accessory according to one embodiment of the invention for use with a communicating appliance.

Referring to FIG. 26, the audio communication accessory 160 can be directly mounted to the appliance 12, 14, as shown at 160A or can be separate or remote from the appliance 12, 14 as shown at 160B. In the latter case, the remote audio communication accessory 160B can be located in the home at a convenient location for the user. In one embodiment, the audio communication accessory 160A mounted to the appliance 12, 14 can communicate with the remote audio communication accessory 160B so that the audible information is communicated at more than one location. It is also contemplated that the audio communication accessory 160 can communicate with other audio devices, such as a telephone, a stereo system, a clock radio, and a cellular phone, so that the information can be communicated audibly through the audio device and increase the likelihood that the user will hear the information.

Examples of the information communicated by the audio communication accessory to the user can include, but are not limited to, notifications concerning an operational status of the appliance or other component, such as fireplace on, security system activated, carbon monoxide alarm activated, appliance door open, temperature limits exceeded, leakage, filter requires changing, end of operation cycle, cooktop burner on, oven pre-heat complete, fabric/dish washing complete, water temperature, circuit breaker blown, energy usage status, and energy usage exceeds preprogrammed limit. Examples of the information communicated from the user to the audio communication accessory can include, but are not limited to, commands concerning an operational status of the appliance or other component, such as call or otherwise contact emergency personnel, turn on outdoor spa, turn on outdoor sprinkler system, extend dryer operation cycle, and initiate operation cycle.

Other examples of utilizing the audio communication accessory follow. In one embodiment, the audio communication accessory can be used as an event calendar where the user can record an event, such as a reminder to take medicine, and the audio communication accessory can play the reminder at the appropriate time. As another example, the audio communication accessory can communicate with a source of weather information, such as via the Internet, and notify the user of weather conditions on demand or at preprogrammed times. It is also contemplated that the audio communication accessory can be used in conjunction with tracking devices to locate items in the home. For example, a set of keys can be equipped with the tracking device, and the audio communication accessory can communicate to the user the location of keys when the user cannot find the keys. The audio communication accessory can also be employed as an intercom system where multiple users can communicate with one another through the audio communication accessory. In this scenario, the users can each have the audio communication accessory, or the single audio communication accessory can interface with another device to enable two-way communication. In another embodiment, the audio communication accessory can be used to place the appliances or other components on the network in a "sleep mode," which can include, for example, shutting off lights, lower heating temperature, and activating the security system, when the user provides a sleep mode command as the user is going to bed. As another example, the audio communication accessory can be used in conjunction with the sales demo accessory described above to audibly enhance the sales demos for the appliance. The customer could effectively talk to the appliance and vice-versa, thereby improving the customer interaction with the appliance at the retail store. It is also contemplated that the audio communication accessory can be used in conjunction with an outdoor audio system and/or outdoor camera whereby the user can audibly communicate with a person who has activated a doorbell and/or view, such as via a display on a cellular phone, images of the person who has activated the doorbell. As another example, the audio communication accessory can communicate with a computing device or telephone system and notify the user when the user has received new electronic mail messages and voice mail messages.

The audio communication accessory can also be used to implement an audible use and care guide associated with the appliance. The audible use and care guide can be considered a replacement or addition to a conventional user manual that a user must read. Listening to the audible user and care guide can be more convenient, more efficient, and more easily understood than reading the conventional user manual. The audible use and care guide can include content traditionally included in the conventional user manual, such as explanations of the operational cycles and/or features of the appliance, troubleshooting information, and recommendations for care of different types of items used in the appliance (e.g., laundry, dishes, foods). As an improvement, the audible use and care guide can be configured to communicate information related to operation cycles selected in real-time by the user. Thus, as the operation cycle is being selected by the user, the audible use and care guide can inform the user, for example, how to use the operation cycle, what the operation cycle is meant for, what options are available for the operation cycle, and steps for programming the operation cycle.

The audible use and care guide can be activated prior to using the appliance for the first time or at any time the user requires assistance. In one embodiment, the audible use and care guide can be always accessible and activated by the user actuating a button on the appliance or voice activation via the audio communication accessory. The user can optionally interact with the audible use and care guide, such as by asking questions or instructing the audible use and care guide to skip information not needed by the user. According to one embodiment, the audible use and care guide can implement multiple, selectable modes for various use scenarios, such as whether the appliance is on the floor of a retail store as a sales demo, for a new appliance in the home, for a new user, or for an experienced user. The amount of information and level of detail in the information provided to the user can depend on the experience of the user. The audible use and care guide can be disabled if it becomes annoying or can be reconfigured.

The audio communication accessory can optionally include tactile feedback, such as vibration, which can be especially useful for users having a hearing disability. The tactile feedback can be used in conjunction with or as an alternative to the audio communication. The user can wear or carry a portable device that provides the tactile feedback.

Regardless of the type of accessory, the software architecture can be configured such that the accessory must present electronic credentials (i.e., authentication) before communicating with the appliance. Requiring the electronic credentials prevents unauthorized communication between the accessory and the appliance, thereby avoiding undesirable control of the appliance by the accessory.

Figure 27:
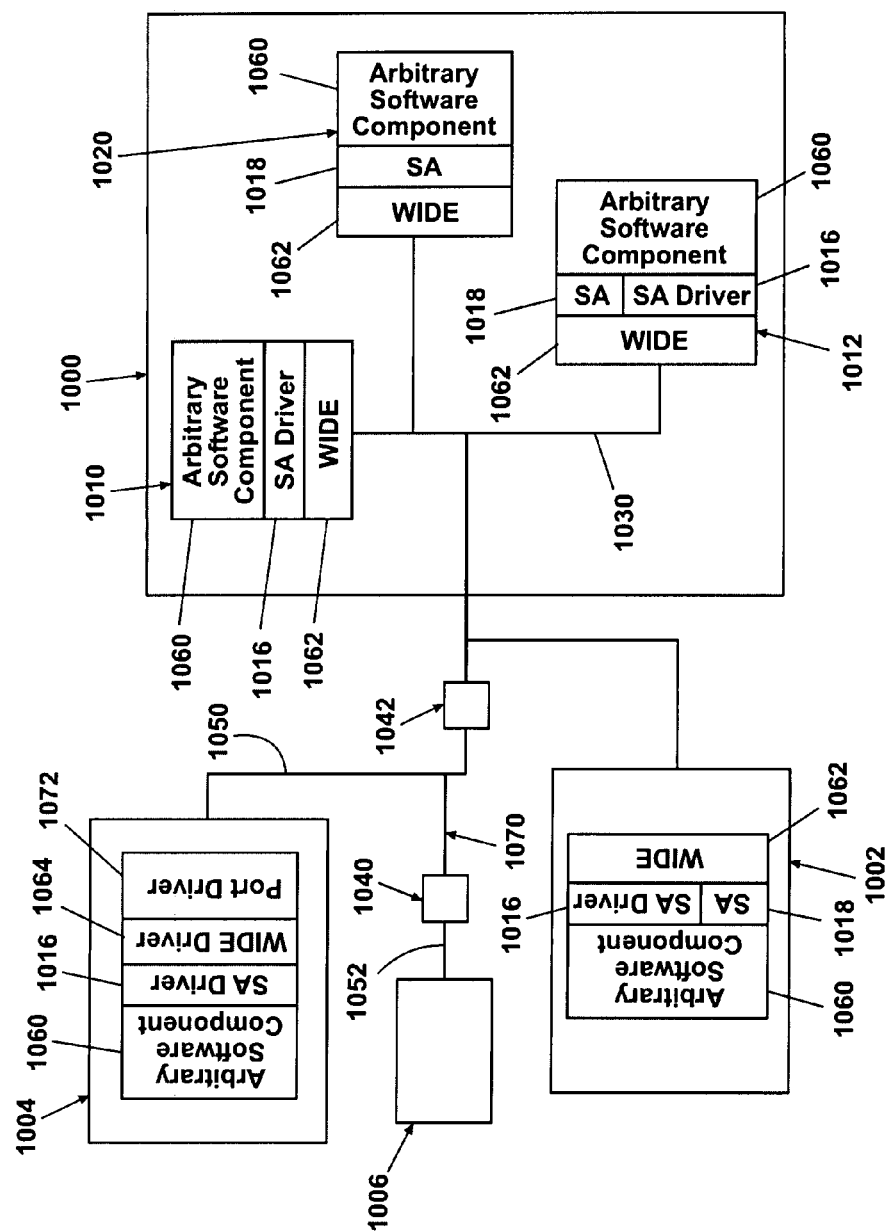
FIG. 27 is a schematic view of a network of appliances and clients connected on multiple networks by couplers.

FIG. 27 illustrates an appliance 1000 connected to external clients 1002, 1004 and a second appliance 1006 by a plurality of networks. A first network 1030 comprises a first internal client 1010, a second internal client 1012 and the external client 1002. A second network 1050 comprises the external client 1004. And a third network 1052 comprises the second appliance 1006. Each client is characterized as a node on the respective network. Local clients are clients that communicate with nodes on the same network. Remote clients are clients not directly coupled to the same network as the node to which they are communicating. In this embodiment, external client 1004 would be a remote client of the nodes on the first network 1030.

Each client node 1002, 1004, 1010, 1012 comprises a software architecture driver (SA driver) 1016 for exchanging messages with any node having a software architecture (SA) 1018 thereon. The nodes on any given network are in operable communication with the other nodes in that network and are optionally in communication with the nodes present on other networks.

The appliance 1000 further comprises at least one node 1020 having the SA thereon. The second appliance 1006 will also likely have a node with the SA on it, and may have one or more clients as well. The first network 1030 also comprises the node 1020.

Smart couplers 1040, 1042 are special devices that connect to the appliance and/or to a network and/or to two or more networks and communicate therebetween. Each smart coupler can comprise all the functionality of a node, and each node can comprise all of the functionality of a coupler. In this embodiment, the coupler 1040 couples the second network 1050 to the third network 1052, and can function as a node on each network. The smart coupler 1042 couples the second network 1050 to the first network 1030. It could also be considered as coupled to the appliance 1000. A smart coupler can comprise a processor, memory (fixed and/or removable), software, components and circuitry coupled to at least one transmission media. The smart coupler is configured to take information from the memory of its processor and, with the circuitry and components, produce a signal representing that information onto a transmission media. A smart coupler can also comprise a source of power, a GFA sensor, an opto-isolation circuit, a converter circuit, an interface expander 324, network health analyzing circuitry and software.

The smart coupler can be used to communicatively couple at least one external client 170 to a network of the appliance 12 such that the external client 170 and the appliance 12 can exchange messages therebetween. The external client 170 and the smart coupler can each comprise a network. If desired, multiple external clients 170 can be communicatively coupled to the appliance 12 using one or more smart couplers.

Either of the couplers 1040, 1042 can propagate discovery messages issued by the SA or an SA driver across the networks in order to enable the SA and SA drivers or their coupled arbitrary software components to develop references to identifiers of functionality for the different nodes. Each coupler 1040, 1042 can have a routing table stored in a memory for enabling communication between nodes on different networks. The memory can also store identifiers identifying the functionality of each node. The identifiers can be linked to the routing information held within the routing tables so that when a message comprising an identifier is sent to either of the couplers 1040, 1042, the coupler receiving the message can send the message to the appropriate next node.

Each node can comprise a unique combination of software elements. The software elements on any given node include at least one of the SA and an SA driver. The SA driver enables a node to communicate with the SA. The SA inherently includes an SA driver or a variant of the SA Driver. Each node comprising the SA can communicate with other nodes comprising the SA. However, a node can have both the SA and separate SA driver thereon. Each node must also include a suitable communication protocol or communication protocol driver for the respective network type to which it is coupled. An exemplary protocol is the WIDE network protocol 1062, a proprietary appliance network protocol utilized by Whirlpool Corporation. For a client not having WIDE network protocol that needs to communicate WIDE messages (e.g., external client 1004), a WIDE driver 1064 can be used. A port driver 1072 couples the external client 1004 to the network 1050.

Each node can also comprise an arbitrary software component 1060. The SA driver 1016 is a software element configured to allow an arbitrary software component to communicate with the SA 1018 over at least one network. An arbitrary software component is any software component or subcomponent that performs a useful function. Examples include, but are not limited to, a communication driver, an application, a user interface, a control algorithm, message routing, a control for an operational cycle, message handling, data storage, data transformation, data referencing, and software that instructs other software. The SA driver 1016 can receive and at least partially interpret messages from the SA and/or from another SA driver, which are specified as feedback events. In some instances, the SA driver 1016 can also send command messages to the SA 1018. In this respect, the external clients 1002, 1004 can have full capability act as an accessory to communicate with and to enhance or alter the operation of the appliance.

It will be understood that any or all of the external clients 1002, 1004, the couplers 1040, 1042, and the internal clients 1010, 1012 can be physical devices that have a processor, a memory, software, circuitry, and some source of power. In the general sense, they are coupled to transmission media and are preferably configured to take information from the memory and with the processor and the circuitry, produce a signal representing that information in the transmission media. When the information includes an identifier in memory, the node or client is discoverable by other nodes connected via the transmission media.

Discovery is a process by which a first node in communication with at least one coupled network sends discovery messages to the network or networks. Discovery messages generally comprise at least some query information specifying what the sender of the discovery message seeks. The information sought can be information such as another node, an appliance, a client, an arbitrary software component, a device comprising a node, a coupler, or one or more of a plurality of identifiable software elements on any node.

A discovery confirmation message is a reply message sent to the sender of a discovery message. Discovery reply messages typically comprise confirmation information and identification information. The confirmation information is an acknowledgment in the form of a positive or a negative response. The identification information is information enabling the sender to send subsequent messages to that which has been discovered. The identification information could be raw routing information or could be an identifier which could be used to pull raw routing information out of a routing table. Further the identification information could be an identifier used to get raw routing information from a routing table and other functional identification information out of a routing table. With the ability to create routing tables either by the method of propagated discovery or by a combination of propagated discovery and manual or semi-manual configuration, clients can establish useful communications with other communicating nodes and can rely on the propagated message and the routing table to enable the useful communications without the arbitrary software components of the clients to have knowledge of the routing information required to enable the useful communication.

Where more than one network is connected by a smart coupler, such as couplers 1040, 1042, a message received by the smart coupler from one network can be propagated and sent to the second network. The smart coupler may create a second separate message with the same information compatible for a second network, but together, the first and the second messages are considered a single propagated message, even though they may be literally two messages. A propagated discovery message, then, is a discovery message that is propagated to a receiver. A coupler may be configured to inspect propagated messages to prevent propagation of a circular message, i.e, a sent message that is also received by the sender on a second network to which the sender is coupled. At least the smart coupler 1042 may hold a routing table constructed from a plurality of Discovery Confirmation Messages. In one embodiment, the routing table holds identifiers from other nodes with each identifiers routing information. In a second embodiment, the routing table holds identifiers from other nodes with each identifier's routing information and with a new identifier that will be used to represent the identifiers from other nodes. The new identifier can be considered a proxy identifier.

Referring again to FIG. 21, a smart wireless coupler 122 comprises two smart couplers, a first smart coupler with an wireless communicating component connected to the appliance 12, and a second smart coupler with a wireless communicating component in communication with the first smart coupler and coupled to the external client 124, here a PC. Coupling occurs via an appropriate communications protocol and circuitry compatible with the external client 124. Additional examples of external clients that can be used with the invention include other computers, specialized diagnostic devices, cell phones, PDAs, various diagnostic sensing apparatus, a source of information about a resource, a second appliance, another smart coupler, a clock, an atomic clock, and consumable reader, a cooking accessory, a cooking sensor, a cycle of operation accessory, a cooking utensil, an energy control, a smart laundry card, a network binder, an audio accessory, a recipe book interface, a sales demo, a television, a smart dimmer, a smart outlet, a user interface, dongles, personal computer-based appliance control development tools, a factory testing application, a consumer field test data collector, an interface to a connected home environment other appliances, and any other device comprising a node configured to communicate usefully with an appliance. The smart coupler can be powered via its connection to the appliance 12 and/or the external client 124.

Figure 28:
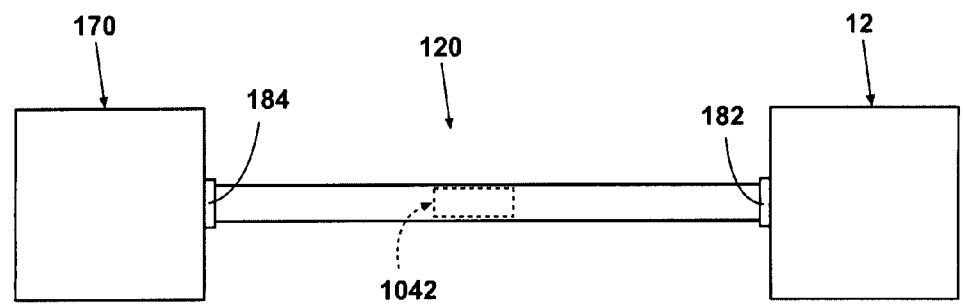
FIG. 28 is a schematic view of an over-molded smart cable comprising an embedded smart device according to one embodiment of the invention for use with an appliance.

In an embodiment of the invention embodiment shown in FIG. 28, a smart cable 120 comprises a smart coupler 1042 enclosed within a length of conduit with connectors 184 and 182 on either end. The smart cable 120 includes wiring between at least one external device 170 and the appliance 12 by way of the smart coupler 1042, such that the external client 170 and the appliance 12 are able to exchange information via the smart coupler 1042. Alternatively, the smart cable 120 can be hardwired to a network having the external client 170 thereon. The smart cable 120 can comprise any type of transmission line within the length of cable suitable for the purposes described herein. The smart cable 120 can comprise multiple types of cable and is preferably over-molded. The advantage of an over-molded cable is that it is a single article not subject to inadvertent separation from its component functional parts. This will make the total cost of ownership less and will make the distribution and testing of the smart cable 120 simpler. Examples include but are not limited to multicore cable, twinax cable, ribbon cable, optical fiber, twisted pair cable, dielectric slabs, or electric power lines, or any combination thereof.

Figure 29:
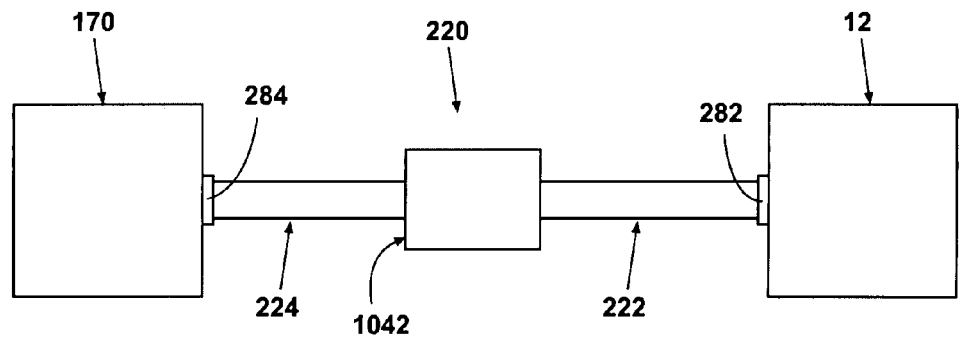
FIG. 29 is a schematic view of a smart cable comprising a discrete smart device according to one embodiment of the invention for use with an appliance and an external device.

In another embodiment illustrated in FIG. 29, a smart cable 220 comprises an appliance pigtail 222 and an external client pigtail 224 with a smart coupler 1042 connected therebetween. Both the appliance pigtail 222 and the external client pigtail 224 comprise a length of cable. The pigtails 222, 224 also include an appliance connector 282 and an external client connector 284 on their respective ends. The connectors 282, 284 are configured to communicatively couple the smart cable 120 to the appliance 12 and to the external client 170, respectively. The pigtails 222, 224 can be permanently coupled to the smart coupler 1042 at ends opposite the connectors 282, 284.

Figure 30:
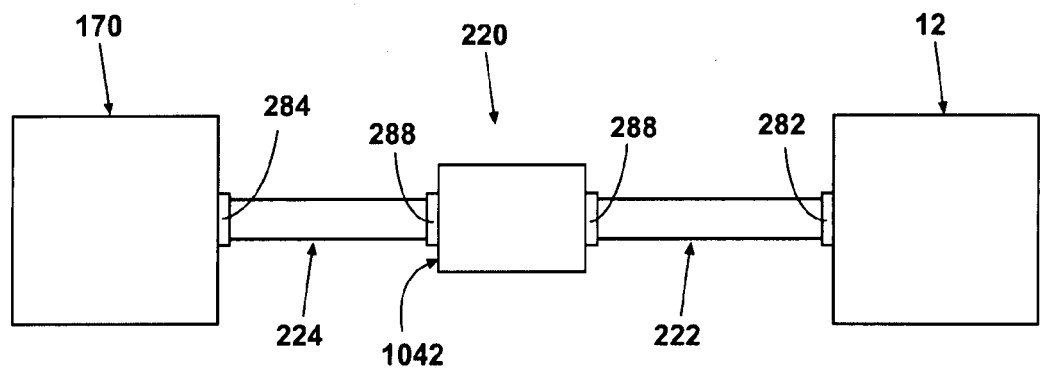
FIG. 30 is a schematic view of a smart cable comprising a discrete smart device and smart device connectors according to one embodiment of the invention for use with an appliance and an external device.

Alternatively, as illustrated in FIG. 30, the pigtails 222, 224 can be removably coupled to the smart coupler 1042 by connectors 288 at ends opposite the appliance connector 282 and the external client connector 284, respectively. The smart device connectors 288 enable the pigtails 222, 224 to be interchanged with other pigtails having smart device connectors 288 on one end and different types of appliance connectors 282 and external client connectors 284 on the other. This facilitates connection of the smart cable 220 to a plurality of different appliances 12 and external devices 170.

Alternatively, appliance connector 182 or 282 can be coupled to a smart connector [defined below] for the purpose of coupling the smart cables 182 or 282 or a smart wireless coupler to an internal communicating node of the appliance not directly compatible with the interface provided for by 182 or 282.

The smart cables 120, 220 can be different types of cables in order to accommodate different transmission standards employed by different appliances 12 and external devices 170. For example, if the external device 170 connected to the smart cable 120, 220 uses two-wire cable, and the appliance 12 connected to the smart cable 120, 220 uses one-wire cable, the smart cable 120, 220 can comprise a one-wire portion of cable and a two-wire portion of cable with a suitable converter therebetween. Alternatively, the appliance 12, the external client 170, or the smart coupler 1042 can comprise a suitable converter for transmitting messages between different types of transmission lines.

Preferably, a conventional opto-isolation circuit for providing separation between the electrical networks of the coupled devices 12 and 170 is included in some portion of the apparatus comprising the smart cable 120, 220 and any smart connectors interposed between the client 170 and the appliance 12. Opto-isolation requires a 2 wire communication configuration, so preferably, the opto-isolator is provided in the portion of the apparatus where there is 2 wire communications. The opto-isolation circuit electrically isolates the appliance 12 from the smart cable 120, 220. A grid friendly appliance sensor (a type of frequency sensor—see discussion below) can also be included in the smart coupler 1040, the appliance 12, or any another node in communication on the network. The grid friendly appliance sensor instructs the appliance 12 when the AC Voltage frequency falls below a given threshold. An exemplary threshold is a lower threshold of 59.95 Hertz; when the monitored frequency falls below 59.95 Hertz, various loads of the appliance can be instructed or requested to turn off. A software component configured to respond to resource-related commands will determine the appropriate response to the information provided by the grid friendly sensor. Generally, the software component configured to respond to a resource-related command will not compromise the appliance cycle of operation with respect to any consumer benefit.

The smart coupler 1042 can be used as the primary smart component within several embodiments. For example, it is the smart component within the smart cable 120, 220. It can also be operated in a "stand alone" mode. In the stand alone mode, the smart coupler, 1042 can be connected to only one of the appliance 12 and the external client 170. The smart coupler, 1042 can receive power from the external client 170 or the appliance 12 in the stand alone mode or it can be powered by an auxiliary power source, which will be discussed in more detail hereinafter. The smart coupler 1042 is also the primary smart component within the embodiments of FIGS. 28, 29, 30, 31, 32, and 34.

Figure 33:
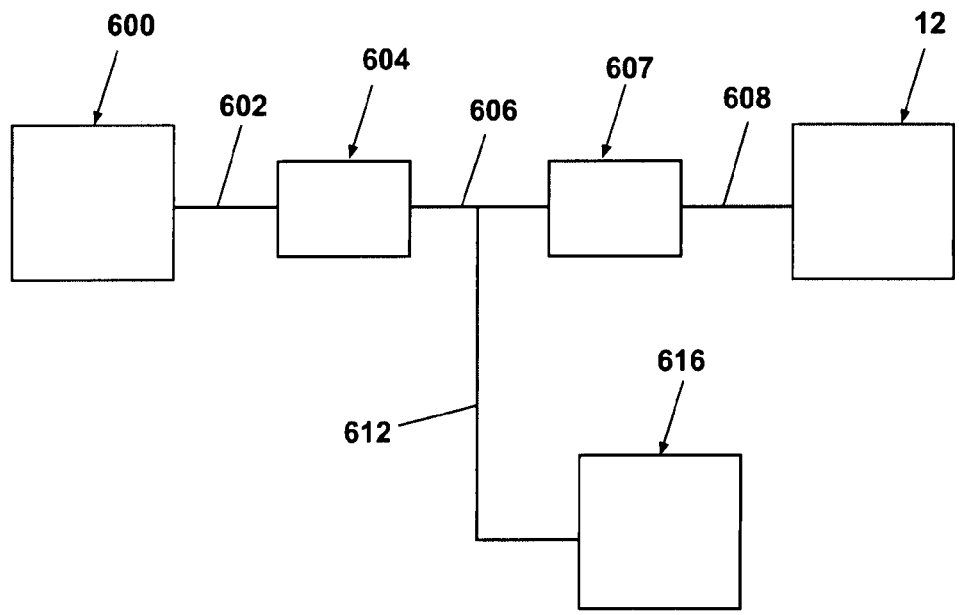
FIG. 33 is a schematic view of a source of information about resources connected to an appliance with a smart coupler directly coupled to an appliance connection element.

Looking now at FIG. 33, the smart coupler 607 can also provide information to any software component configured to respond to resource related commands with respect to certain standard energy information signals when it is in communication with a source of information about a resource 600. Such software component can reside on the smart coupler itself, in the appliance 12, in smart coupler 604, in client 600 and/or in device 616. An example of a source of information about a resource would be a power utility that would be in communication with a smart coupler. The signals can include but are not limited to a demand response (DR) signal instructing a component of the appliance 12 to reduce consumption of the resource, a signal indicating time-of-use pricing of the resource (TOU pricing), a critical peak pricing of the resource (CPP) signal indicating a significant short-term price increase due to demand exceeding supply or inability of the power grid to handle high-energy demands, a signal specifying real-time pricing (RTP), and critical peak rebate (CPR) signals indicating a rebate for reduced consumption at a given time. The software component configured to respond to a resource related command can reside in the smart coupler 1042, in the appliance 12, in the source of information about a resource 600, in a second appliance, or in any other node in communication with the smart coupler.

Referring again to FIGS. 28-31, the smart coupler 1042 or smart wireless coupler can also include authentication and encryption capabilities. Authentication serves to validate the connected appliance 12 and/or external client 170, and/or applications included on the appliance and/or on the external client 170. Encryption acts as a key to unlock and expose the appropriate services to the connected appliance 12, external client 170, or application and prevents the unauthorized use of services which are not exposed and not intended for use by a non-authenticated appliance, external client, or application. The smart coupler 1040 or the smart wireless coupler (see FIG. 21) can include special, proprietary electronics that enable communication between the appliance 12 and the external client 170. As a result, unauthorized persons who do not have the smart cable 120, 220 or smart wireless coupler cannot couple an unauthorized external client 170 with the appliance.

Any of the connectors 182, 184, 282, 284, 288 or an appliance connection element 400 can be a smart connector. A smart connector is a wired or wireless connector that has specialized circuitry, structural adaptations, hardware, and/or software that provide additional functionality beyond that of a conventional connector. Conventional connectors are passive devices that do not modify or examine the packets sent therethrough. The function of a conventional connection is to electrically mate the pins of one connector to the corresponding sockets of another connector. In addition to the conventional function of a connector, smart connectors can incorporate one-wire to two-wire conversion, other types of conversion, level shifting of the electrical signals, power management functionalities, protocol translation, opto-isolation, authentication, encryption, mechanical adaptations or any combination thereof. A smart connector can be more or less permanently connected to an appliance. Smart connectors can be ganged or daisy chained together to provide a composite function from a collection of functions comprised by each individual smart connector. Power management functionalities can include AC/DC conversion and the ability to control the amount of power drawn through the smart connector. Smart connectors can also be designed so as to expose additional networks or other points of connectivity; for example, a smart connector can have a first connection point designed to accept a smart cable 120, 220 as well as a second connection point designed to accept a second cable of a specialized diagnostic device. Preferably, the appliance connection element 400 is a smart connector (see FIG. 33A and 400).

Figure 31:
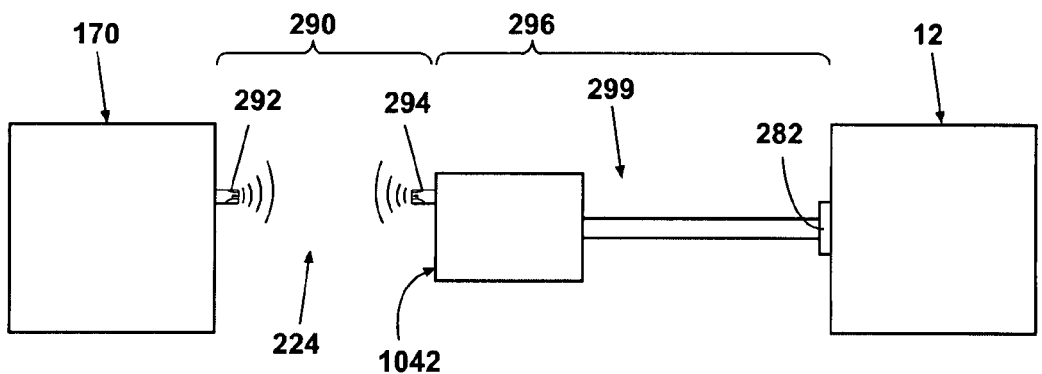
FIG. 31 is a schematic view of a combination smart wireless coupler and smart cable according to one embodiment of the invention for use with an appliance and an external device.

For example, the embodiment illustrated in FIG. 31 comprises a smart wireless coupler 290 coupled to a smart cable 296. The smart wireless coupler 290 comprises a first wireless communicating component 292 communicatively coupled to an external client 170 and a second communicating component 294 in communication with the first communicating component 292 and communicatively coupled to a smart coupler 1042 of the smart cable 296. The smart cable 296 comprises the smart coupler 1042 and an appliance pigtail 299 similar to the appliance pigtail 222. The appliance pigtail 299 communicatively couples the smart device 180 to the appliance 12.

Figure 32:
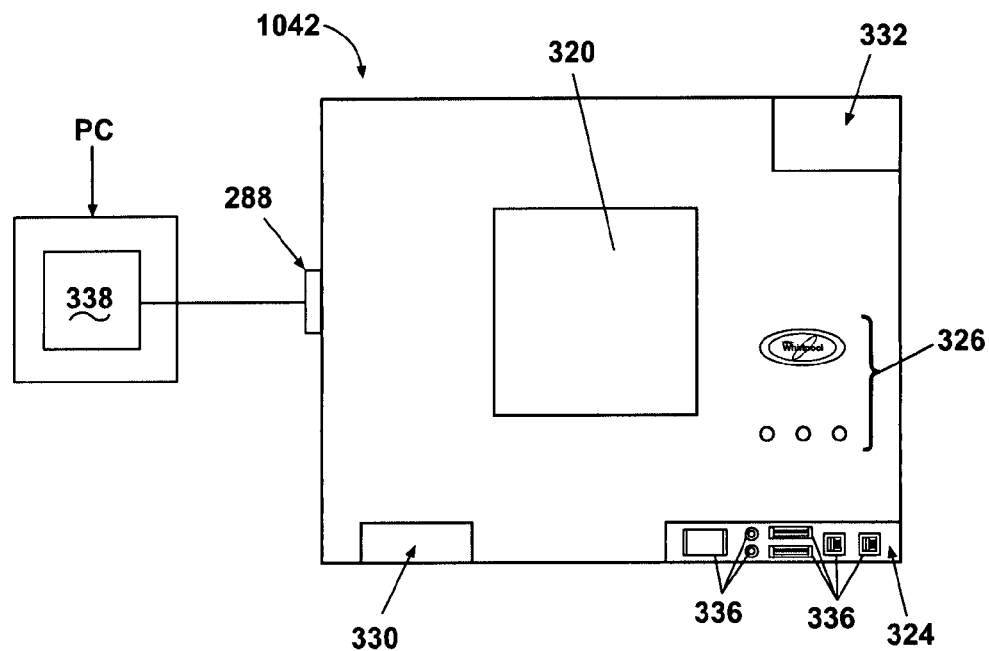
FIG. 32 is a schematic view of a smart device according to one embodiment of the invention.

Looking now to FIG. 32, the smart coupler 1042 comprises a microprocessor 320 having at least one arbitrary software component stored in the memory thereon. The arbitrary software component can be an application or driver stored in memory thereon and accessible by any external clients 170 or other appliances connected to the smart coupler 1040. Preferably, the arbitrary software component comprises at least a driver for enabling communication between the smart coupler 1042 and a second device coupled to a network on which coupler 1040 is also coupled. An exemplary arbitrary software component is an SA driver. Referring now to FIG. 27, client 1004 can establish minimal functional communications with smart coupler 1042 as long as 1004 is configured with the proper port driver 1072. Further, SA driver 1016 or a useful application such as a Service and Diagnostic Software Application in the form of an Arbitrary Software Component 1060 can be automatically sent to or loaded by client 1004 from the memory of smart coupler 1042. In this way, a smart coupler can enable connected clients to install software components necessary of full functional communications from the smart couplers with which they are connected, or conversely, the smart coupler can install the software on the client. Likewise, a smart coupler can use the internet connection of its connected clients to retrieve new arbitrary software components for its own internal operation or for further distribution to other any other coupled clients 170 or any appliances 12. The smart coupler 1042 can further comprise any number of additional arbitrary software components.

Looking again at FIG. 32, the microprocessor 320 can include any number of elements common to microprocessors, such as ROM, RAM, on-chip flash memory, transistors, and various communication buses. The smart coupler 1042 further includes analyzing circuitry and software that monitors physical signals associated with the circuitry coupled to at least one transmission media. This feature can be useful during the diagnosis process because the client 1004, 124 can check the health of 1030 before commencing any useful diagnosis processes requiring communications with Appliance 1000, 12.

The smart coupler 1040 can further comprise an alternate power source 332, an interface expander 324, a variable display 326 enabled to display licensable content simultaneous with indications about the information relating to the smart coupler 1040 and information about devices with which it is in communication with, and a removable memory 330. The smart coupler 1040 can be powered via connection to the external client 170 and/or the appliance 12. When in "stand alone" mode, or at a user's selection, the smart coupler 1040 can also be powered by the alternate power source 332, which can be electrically isolated from the appliance 12 and/or the external client 170. The alternate power source 332 can be a battery. The alternate power source 332 can also be a connection to another power source, such as a wall transformer that can be plugged into a conventional electrical outlet.

The interface expander 324 comprises a plurality of ports 336 for enabling the microprocessor 320 to communicatively couple with a plurality of additional external auxiliary sources of information. Each port 336 can be configured by a port configuration tool 338 in order to communicate with the plurality of external auxiliary sources of information having their own physical connection and protocol requirements. The port configuration tool 338 can reside on a PC and couple to the smart coupler 1042 via 284 (for example). The importance of the port configuration tool is that it allows the interface expander 324 pin definitions to be redefined by the client 170,1004 Alternatively, the port configuration tool 338 can be stored in the memory of the smart coupler 1042 and for uploading by or installing on the client 170, 1004.

The removable memory 330 can also be used to configure the interface expander 324 by using an external client 170 having the port configuration tool 338 thereon to write instructions to the removable memory 330. Once the removable memory 330 is connected to the smart device 180, the microprocessor 320 can read the instructions on the removable memory 330 and configure the ports 336 accordingly. Examples of the different pin configurations on the interface expander 324 include but are not limited to a general purpose input/output, a power port, a wireless port, a USB port, a serial ports like SCI, SPI or RX, TX, a ground, an analog-to-digital converter port, a plurality of Boolean IO Points, analog inputs and outputs configured in the form of 0-5Vdc, +/−10Vdc, 4-20 ma, PWM outputs. The removable memory 330 can also be used with the smart coupler 1042 to deliver upgrades, deliver applications, store data and event logs, deliver and store data about a cycle structure, deliver and store information about a resource, deliver drivers or other applications to an external client 170, hold data about messages, hold data to populate a routing table, and hold data about consumables. The display 326 can visually convey information about the status of the smart coupler to a user. An exemplary display can consist of tri-color LED lights that produce different patterns depending on the status of the smart coupler. The display 326 can also include an illuminated image depicting a brand name, logo, or other indicia associated with the appliance.

The interface expander 324 can be configured to couple to any electronic peripheral including sensors, data sources, and auxiliary communicating nodes. An auxiliary wireless device 350 can be coupled to the interface expander 324 when it is properly configured. It is anticipated that when smart coupler 1042, receives a propagated message, smart coupler will propagate the message to the networks to which its coupled including any network configured to receive the propagated message that is in communication to the smart coupler 1042 coupled to the smart coupler 1042 via the interface expander 324.

Figure 33A:
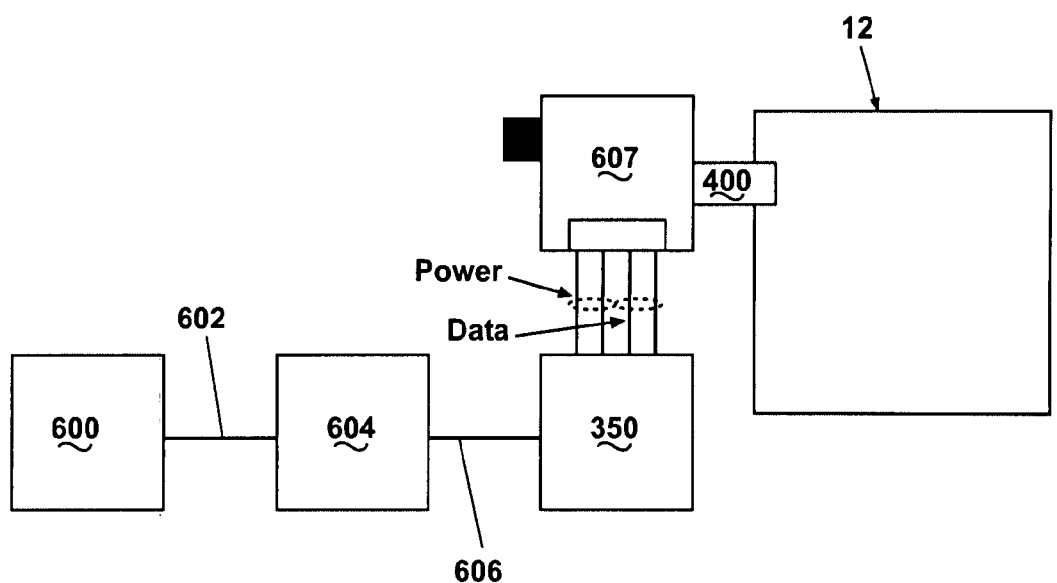
FIG. 33A is schematic view of a source of information about resources connected to an appliance by a combination

Referring now to FIG. 33A, the smart coupler 607 is directly coupled to appliance connection element 400 on the appliance 12 in a direct mount configuration. In this embodiment, smart coupler 1042 further has a smart auxiliary wireless communicating component 350 coupled to the smart coupler 607 via the interface expander 324. In this embodiment the interface expander 324 has at least some of its pins configured as general purpose input Booleans with an associated component of software configured to receive messages from a source 600 of information about a resource. In this embodiment, the path of the messages is between the source 600 of information about a resource and a first coupler 604, then between the first coupler 604 and the smart auxiliary wireless communicating component 350 which acts as a second coupler. Then the messaging passes between the smart auxiliary wireless communicating component 350 and the smart coupler 607 directly mounted to the Appliance 12, where the transmission media coupling smart auxiliary wireless communicating component 350 to the smart coupler 607 is the Boolean or Binary network provided by the interface expander 324. The advantage of this network, optimally configured for resource messages, is that it allows a decoupling point between two complex halves of the network where the first half comprises componentry from the source 600 up to the interface of the interface expander 324, and the second half comprising the interface expander 324 through the appliance 12. As the configuration of the interface expander 324 in this embodiment is exceedingly simple, the information contract comprising the aforementioned exemplary energy management signals (DR, TOU, and the like) is most easily and rapidly described, promoted, and adopted. Further, the information contract is advantageous when the messaging architecture and protocols implemented by the smart couplers in communication on either side of that contract are different from one another, and where the dissimilarities of the differences are significant from one region of the country to the next or one type of appliance coupler to the next, and so on.

Figure 34:
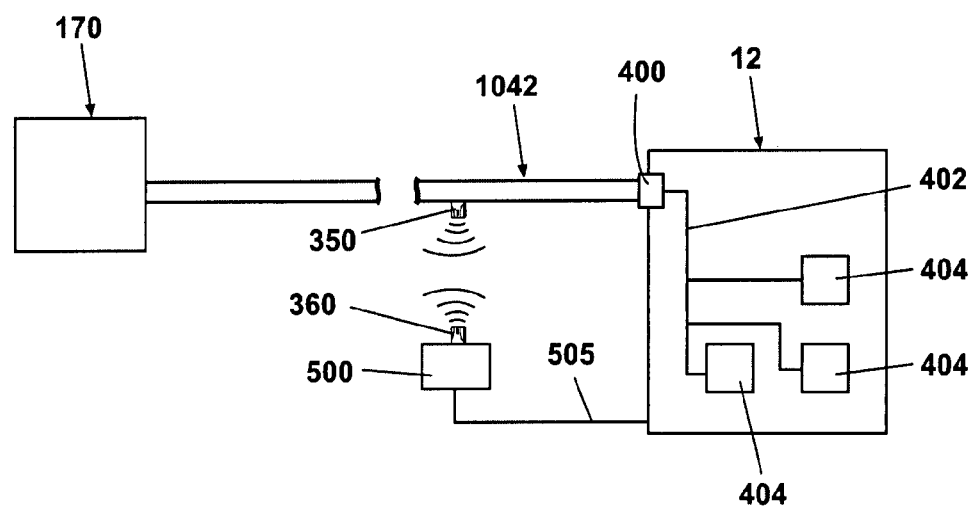
FIG. 34 is a schematic view of a source of information about appliance operation connected to an appliance through a smart coupler.

The appliance connection element 400 provides access to an internal network 402 of the appliance 12 as is illustrated in FIG. 34. The internal network 402 connects the various internal components 404 of the appliance 12. The appliance connection element 400 can connect to any internal component 404 of the appliance, such as a control board, or it can connect directly to the internal network 400. The appliance connection element 400 can be a standardized connection element integrated into all appliances manufactured by a particular company, or it can be a specialized connection element unique to certain models of appliances. A single instance of an appliance 12 typically comprises multiple various and different embodiments of the connection element 400 where there is at least one connection element on each node 404 in communication with the network 402 and at least one additional connection element 400 for connecting external clients such as a smart coupler 1042.

Referring now to FIG. 34, an appliance connection element 400 can be a conventional connector or it can be a smart connector. It can be configured to facilitate communication between the appliance 12 and the smart coupler 1042. If the appliance connection element 400 is not structured to receive the desired connector on the smart coupler 1042, a suitable connector adapter can be used, e.g., a conventional connector or a smart connector. In this way, the smart cable 120, 220 or a smart coupler 1042, or the 'Appliance Half' of the smart wireless coupler can be connected to any appliance connection element 400 by using a suitable connector adapter. An example would be a converter dongle that plugs into the appliance connection element 400 and provides a suitable port for receiving the connector 282 or 182 (see FIGS. 28-31). Another example is an adapter comprising a length of cable with connectors at each end configured to couple to the smart coupler and to the appliance 12, respectively. Adapters and smart connectors can also be used to communicatively couple the external device 170 with the smart coupler. Preferably, an appliance comprises a appliance connection element 400 configured as a Smart Connector and further configured to receive external clients either by a direct mount or by a length of cable and further configured to receive external clients installed by the consumer without uninstalling the appliance 12 and without, or without significant tool usage.

FIG. 33 illustrates a system where resources in the appliance or any other resource consuming device configured for communication can be monitored, managed, or changed as in the energy controller accessory of FIG. 13. The energy controller accessory can stand alone or be incorporated into any element of the system. A likely scenario has a smart coupler 607 directly mounted and connected to the appliance 12 by a network 608. The network 608 can be a WIDE network as described previously herein. The smart coupler 607 also connects to a connecting element 604 via a second network 606 that can be a different type of network from network 608. The connecting element 604 can be a second smart coupler, a smart connector, or a conventional connector. If network 602 is a different type of network from network 606, the connecting element 604 is a smart coupler or a smart connector having protocol conversion capabilities. An example of the network 606 is a wireless Zigbee network and an example of the network 602 is the Internet.

Smart coupler 604 connects to a source of information about at least one resource 600 generated or used by the appliance 12 and/or by a different kind of resource consuming device 616 such as a light switch, ceiling fan, water heater, or the like. The connection between the smart coupler 604 and the source 600 is by a third network 602 that can be a different type of network from either network 608 or network 606. Assume that the source 600 wants to send information about at least one resource to the appliance 12 or to the device 616. The information can include a request for a change in the operation of the appliance 12 based on the information. The resource can be electricity, hot water, gray water, gas, water, replaceable parts, or other consumables. The source 600 can send information about multiple resources if desired. The invention enables a source of information about a resource 600 in effective communication with consumers of the resource to affect the level of consumption of that resource. Preferably, the source 600 of information about a resource is communicatively coupled to the network 602 to communicate with a second node, having SA for example, which may be among several on the appliance 12 or on the device 616. We assume that the source 600 has at least an appropriate communication driver, or one of the smart coupler 607 and the connecting element 604 has software to translate any message from the source 600 to the communication protocols of the incorporated PCT/US2006/022420, for example.

In this scenario, the source 600 sends a discovery message over the network 602 seeking any consumer of resources to which the source 600 wants to send information. The connecting element 604 receives the discovery message, translates the message, if necessary, and propagates the discovery message to the next nodes over the network 606, including the smart coupler 607 and devices 616. Coupler 607 receives the discovery message, translates the message, if necessary, and propagates the discovery message to the next nodes over the network 608, including the appliance 12. The relevant nodes in the appliance 12 evaluate the message and determine a discovery reply message, and send respective discovery confirmation messages. Here, we assume at least one reply is positive.

The discovery confirmation message is received by the smart coupler 607, which populates its routing table with routing information about the replying nodes and with identifiers about the replying nodes and sends at least one identifier representing the information in the its routing table to the connecting element 604, which populates its routing table preferably using the same technique as 607 and sends at least one identifier representing the information in the its routing table to source 600 in accord with the foregoing process. Each node retains the relevant identifiers so that subsequent message can be communicated without repeating the discovery sequence. As well, those nodes with memory, such as the couplers, can be configured to save messages.

The functionality described above can be extended to communicate information from the source 600 to an additional device 616 connected to the network 606 by a network 212.

The device 616 can be an additional appliance 12 or other device that is configured to utilize information from the source 600.

With this structure, if an electric utility is facing a brown-out, for example, a source of information about the electricity can send a general message asking for resource consumption reduction to the plurality of communicating nodes which had previously positively responded to the first discovery message sent from 600. The general message is propagated by the plurality of smart couplers coupled to 600 via the network 602 or other networks to which 600 is coupled. Similarly, a source of consumables, such as filters or spare parts, can ascertain from an appliance the status of the consumable and send information about the timing and availability of replacement.

In certain embodiments, there could be a first appliance with a graphical user interface coupled to a smart coupler in communication with a source of information about a resource. The first appliance could also be in communication with a second appliance via at least one smart coupler. The second appliance does not have a graphical user interface. A user of the first appliance could input a parameter into the graphical user interface, such as a price threshold at which the user would prefer to reduce the level of consumption of a resource. This parameter could be stored in the memory of a node in first appliance, in the memory of a smart coupler in communication therewith, or in the memory of the source of information about a resource. When a message is received from the source of information about a resource, the software component configured to respond to information about a resource can use the parameter to determine the response to the information about a resource. The response could be to change the operation of the appliance to reduce a level of resource consumption. The response could also include sending message to the second appliance. The message to the second appliance could either be a command to reduce a level of resource consumption or a message to a second software component configured to respond to the information about a resource. Further, information about the response to the information about a resource can be displayed on the graphical user interface, and the information about the response can come from the first and/or the second appliance.

It should be noted that using discovery messages to populate routing tables is the preferred embodiment. However, routing tables can also be populated using conventional configuration methods involving a manual or semi-manual configuration process. In addition, a manual or semi-manual configuration process can be used in addition to discovery generated routing tables. In this approach, the discovery process or the configuration process can incrementally add or delete routing information within a routing table.

As illustrated in FIG. 34, a smart coupler 1042 can be communicatively coupled to the appliance 12, an external client 170 in the form of a diagnostic PC, and a source 500 of information about operation of the appliance 12 so that failures or other problems in the appliance 12 can be diagnosed, monitored, and/or resolved. The smart coupler 1042, which could be a smart cable 120, 220, is communicatively coupled to a network 402 of the appliance 12 via connection element 400. The smart coupler also connects to the source 500 directly via the interface expander port 324 or via an auxiliary wireless or wired communicating component coupled to the smart coupler via the interface expander port 324 and via a wired or wireless communicating component 360 (see FIG. 33A). The wireless communicating component 360 can be any arbitrary wireless or wired communicating component able to establish communications with the wired or wireless communicating component coupled to the interface expander port 324.

The source 500 connects to the appliance 12 in a manner enabling the source 500 to obtain information about at least one operational parameter or measured value associated with the operation of the appliance 12, e.g., direct connection 505. Exemplary operational parameters include power consumption, temperature, data about the cycle of operation, vibration, noise, and the like. The source 500 can communicate with the network 402 to send information about at least one operational parameter of the appliance 12 to the smart coupler and/or diagnostic PC. Alternatively, the source 500 is not in communication with the network 402 and monitors at least one operational parameter of the appliance 12 by other means. For example, if the appliance 12 is a conventional washing machine, the source 500 can be in communication with an accelerometer attached to the exterior of the washing machine for monitoring vibrations, which enables the detection of an imbalance in the washing machine.

The source 500 can communicate with the smart coupler, the appliance 12, the diagnostic PC, or any combination thereof. We assume that the source 500 has at least an appropriate communication driver, or at least one of the smart coupler, the appliance 12, and the diagnostic PC has software to translate any message from the source 500 to the communication protocols of the incorporated PCT/US2006/022420, for example. It should be understood that the functionality employed by the source 500 can include functional identifiers which can be discovered through propagated messages by any node in communication therewith.

If the appliance 12 experiences a failure that requires a service person to visit the appliance 12 in the home, the service person can couple a PC or other portable computing device to the appliance 12 to diagnose the problem using at least one of the smart cable 120,220 or using the smart wireless coupler, or by using a service key, or by using a central collector. Problems can be diagnosed by sending low-level commands to the appliance from the PC instructing various components in the appliance to turn on or off and/or change their operating parameters. One exemplary way of accomplishing this is by using multiple modes of operation as disclosed in the incorporated PCT/US2006/022420, whereby the client puts at least one software operating layer into a different mode, and the different mode configures the software architecture to receive and act on a different set of messages that provides a different set of functionalities to the external client. Information from the source 500 regarding the operation of the appliance 12 can then be examined in order to see if the instructions from the PC have resulted in a predictable outcome. For example, in order to test a heating element in an oven, the PC would send a command to the oven instructing the heating element to turn on. A measured temperature of an oven cavity having the heating element therein can be sent to the PC by the source 500 or from componentry (including a smart cable) connected to or in communication with internal components 404 or preferably both. This information can be used to determine whether the heating element is functioning properly and heating the oven cavity to a desired temperature.

Information from the source 500 can also cause the PC or any other element in the system to prompt a user at a user interface to choose at least one component 404 to be turned off in the appliance 12, or to take some other action. A user can also enter default actions at the user interface to be taken in response to the receipt of certain information from the source 500. For example, a user can configure the heating element to turn off if the source 500 notifies the system that the temperature of the oven cavity is dangerously high.

Alternatively, the failure code can be sent directly to the appliance 12 to turn off a low-priority component 404. Failure codes can also be sent to the smart coupler, which can use the processor 320 to analyze the code and generate appropriate instructions to be sent to the appliance 12.

While the invention has been specifically described in connection with certain specific embodiments thereof, it is to be understood that this is by way of illustration and not of limitation, and the scope of the appended claims should be construed as broadly as the prior art will permit.

What is claimed is:

1. A network comprising:
   a smart coupler having a processor, a memory, a power source to energize the processor and the memory, and a software component in one of the memory and processor, wherein the software component has a routing table and a protocol converter;
   at least one appliance configured to perform a cycle of operation on a physical article, wherein the at least one appliance consumes at least some of a resource in performing the cycle of operation, the at least one appliance in network communication with the smart coupler using a first protocol,
   a supplier of the resource in network communication with the smart coupler, and
   a source of information about the resource in network communication with the smart coupler using a second protocol,
   wherein the smart coupler is configured to convert network messages between the first and second protocols, propagate discovery queries over the network from the source of information, populate the routing table from responses to discovery queries from the source of information, and facilitate communication with the at least one appliance and the source of information including a request to change the cycle of operation of the appliance based on the information.

2. The network according to claim 1 wherein the appliance has a user interface and one of the at least one appliance and the smart coupler has software to affect the cycle of operation, whereby a user can actuate the software by way of the user interface to affect the cycle of operation in response to the request.

3. The network according to claim 2 wherein the user interface is graphical.

4. The network according to claim 1 wherein the first protocol communicates by packet and the second protocol communicates by binary.

5. The network according to claim 1 wherein the resource is one of electricity, hot water, gray water, gas, water, replaceable parts, and consumables.

6. The network according to claim 1 wherein at least a portion of the network communication is wireless.

7. The network according to claim 1 wherein the information is a resource parameter that is one of greater than a threshold and less than a threshold.

8. The network according to claim 1 wherein the request is one of reduce consumption of the at least one resource, delay consumption of the at least one resource, and halt consumption of the at least one resource.

9. The network according to claim 1 wherein the smart coupler further comprises a visual indicator that communicates information about an appliance.

10. The network according to claim 9 wherein one of the information about the appliance and the information about the resource is licensable.

11. The network according to claim 9 wherein the visual indicator is a tricolor LED.

12. The network according to claim 9 wherein the visual indicator comprises at least one light diffuser.

13. The network according to claim 9 wherein the visual indicator communicates information about the coupler.

14. The network according to claim 1 wherein the appliance has a user interface and one of the appliance and the smart coupler has software to change the cycle of operation, whereby a user can actuate the software by way of the user interface to change the cycle of operation in response to a request.

15. The network according to claim 14 wherein the user interface is graphical.

16. The network according to claim 14 wherein the user interface includes a display, and information about one of the source, the request, and the response is displayed on the user interface.

17. The network according to claim 1 wherein the supplier is a power utility.

18. The network according to claim 17 wherein the supplier is also the source of information.

* * * * *